United States Patent
Iddings et al.

(10) Patent No.: US 8,414,675 B2
(45) Date of Patent: Apr. 9, 2013

(54) AIR CLEANER; AIR FILTER CARTRIDGE AND METHOD OF MANUFACTURING

(75) Inventors: Douglas Lee Iddings, Waconia, MN (US); Jian Xu, Maple Grove, MN (US); Lloyd E. Weisert, Bloomington, MN (US); James R. Scott, Chanhassen, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 12/450,642

(22) PCT Filed: Apr. 2, 2008

(86) PCT No.: PCT/US2008/059137
§ 371 (c)(1),
(2), (4) Date: Mar. 2, 2010

(87) PCT Pub. No.: WO2008/124437
PCT Pub. Date: Oct. 16, 2008

(65) Prior Publication Data
US 2010/0146920 A1    Jun. 17, 2010

Related U.S. Application Data

(60) Provisional application No. 60/921,536, filed on Apr. 3, 2007.

(51) Int. Cl.
*B01D 46/00* (2006.01)

(52) U.S. Cl.
USPC .................. 55/502; 55/498; 55/503; 55/510

(58) Field of Classification Search .................... 55/498, 55/502, 503, 510
See application file for complete search history.

(56) References Cited

U.S. PATENT DOCUMENTS

| | | |
|---|---|---|
| 2,771,156 A | 11/1956 | Kasten et al. |
| 3,002,870 A | 10/1961 | Belgarde et al. |
| 3,048,959 A | 8/1962 | Lowther |
| 3,078,650 A | 2/1963 | Anderson et al. |
| 3,160,488 A | 12/1964 | Wilber |
| 3,169,844 A | 2/1965 | Young |
| 3,290,870 A | 12/1966 | Jensen |
| 3,342,021 A | 9/1967 | Yelinek et al. |
| 3,342,335 A | 9/1967 | Gamundi et al. |
| 3,354,012 A | 11/1967 | Forman et al. |
| 3,357,163 A | 12/1967 | Burger et al. |
| 3,413,780 A | 12/1968 | Amlott et al. |

(Continued)

FOREIGN PATENT DOCUMENTS

| | | |
|---|---|---|
| BE | 1011567 A3 | 11/1989 |
| DE | 198 49 089 A1 | 4/2000 |

(Continued)

*Primary Examiner* — Robert Clemente
(74) *Attorney, Agent, or Firm* — Merchant & Gould P.C.

(57) ABSTRACT

According to the present disclosure an air cleaner and air filter cartridge arrangement is provided. The air filter cartridge is a removable and replaceable cartridge for use in the air cleaner. The cartridge includes, among other things, an end cap having a preferred outwardly directed radial seal and a groove. The air cleaner includes a housing with a ring projecting into an interior, positioned to project against an end of the filter cartridge, when the filter cartridge is mounted for use. Methods of assembly and installation are described.

17 Claims, 24 Drawing Sheets

U.S. PATENT DOCUMENTS

| | | |
|---|---|---|
| 3,423,909 A | 1/1969 | Bennett et al. |
| 3,452,519 A | 7/1969 | Bianchetta |
| 3,488,928 A | 1/1970 | Tarala |
| 3,584,439 A | 6/1971 | Gronholz |
| 3,616,618 A | 11/1971 | Gronholz et al. |
| 3,672,130 A | 6/1972 | Sullivan et al. |
| 3,710,560 A | 1/1973 | Maddocks |
| 3,716,436 A | 2/1973 | Pall et al. |
| 4,006,000 A | 2/1977 | Tortorici et al. |
| 4,036,616 A | 7/1977 | Byrns |
| 4,062,781 A | 12/1977 | Strauss et al. |
| 4,128,251 A | 12/1978 | Gaither et al. |
| 4,135,899 A | 1/1979 | Gauer |
| 4,159,197 A | 6/1979 | Schuler et al. |
| 4,211,543 A | 7/1980 | Tokar et al. |
| 4,222,755 A | 9/1980 | Grotto |
| 4,227,898 A | 10/1980 | Kamekawa et al. |
| 4,235,611 A | 11/1980 | Brownell |
| 4,303,426 A | 12/1981 | Battis |
| 4,312,651 A | 1/1982 | Esaki et al. |
| 4,349,363 A | 9/1982 | Patel et al. |
| 4,350,509 A | 9/1982 | Alseth et al. |
| 4,402,830 A | 9/1983 | Pall |
| 4,488,889 A | 12/1984 | McCarroll |
| 4,491,460 A | 1/1985 | Tokar |
| 4,495,072 A | 1/1985 | Fields |
| 4,498,915 A | 2/1985 | Witchell |
| 4,588,426 A | 5/1986 | Virgille et al. |
| 4,609,465 A | 9/1986 | Miller |
| 4,720,292 A | 1/1988 | Engel et al. |
| 4,728,423 A | 3/1988 | Kuwajima |
| 4,764,191 A | 8/1988 | Morelli |
| 4,801,383 A | 1/1989 | Hoffmann et al. |
| 4,818,261 A | 4/1989 | Beckon |
| 4,838,901 A | 6/1989 | Schmidt et al. |
| 4,950,317 A | 8/1990 | Dottermans |
| 4,955,996 A | 9/1990 | Edwards et al. |
| 5,045,192 A | 9/1991 | Terhune |
| 5,064,458 A | 11/1991 | Machado |
| 5,071,456 A | 12/1991 | Binder et al. |
| 5,082,476 A | 1/1992 | Kahlbaugh et al. |
| 5,112,417 A | 5/1992 | Sayles |
| 5,116,499 A | 5/1992 | Deibel |
| 5,118,417 A | 6/1992 | Deibel |
| 5,120,337 A | 6/1992 | Benzler et al. |
| 5,137,557 A | 8/1992 | Behrendt et al. |
| 5,160,519 A | 11/1992 | Svensson et al. |
| 5,167,683 A | 12/1992 | Behrendt et al. |
| 5,211,846 A | 5/1993 | Kott et al. |
| 5,238,476 A | 8/1993 | Svensson et al. |
| 5,250,179 A | 10/1993 | Spearman |
| 5,277,157 A | 1/1994 | Teich |
| 5,290,445 A | 3/1994 | Buttery |
| 5,431,168 A | 7/1995 | Webster, Jr. |
| 5,442,721 A | 8/1995 | Kalada et al. |
| 5,484,466 A | 1/1996 | Brown et al. |
| 5,545,241 A | 8/1996 | Vanderauwera et al. |
| 5,547,480 A | 8/1996 | Coulonvaux |
| 5,556,440 A | 9/1996 | Mullins et al. |
| 5,601,717 A | 2/1997 | Villette et al. |
| 5,605,555 A | 2/1997 | Patel et al. |
| 5,605,625 A | 2/1997 | Mills |
| 5,613,992 A | 3/1997 | Engel |
| 5,632,791 A | 5/1997 | Oussoren et al. |
| 5,685,985 A | 11/1997 | Brown et al. |
| 5,690,712 A | 11/1997 | Engel |
| 5,700,304 A | 12/1997 | Foo |
| 5,720,788 A | 2/1998 | Puckett et al. |
| 5,720,790 A | 2/1998 | Kometani et al. |
| 5,730,769 A | 3/1998 | Dungs et al. |
| 5,736,040 A | 4/1998 | Duerrstein et al. |
| 5,741,421 A | 4/1998 | Erdmannsdoerfer et al. |
| 5,753,117 A | 5/1998 | Jiang |
| 5,755,842 A | 5/1998 | Patel et al. |
| 5,755,844 A | 5/1998 | Arai et al. |
| 5,800,581 A | 9/1998 | Gielink et al. |
| D401,306 S | 11/1998 | Ward |
| 5,865,863 A | 2/1999 | DeSousa et al. |
| 5,882,367 A | 3/1999 | Morgan et al. |
| 5,893,937 A | 4/1999 | Moessinger |
| 5,897,676 A | 4/1999 | Engel et al. |
| 5,916,435 A | 6/1999 | Spearman et al. |
| 5,919,279 A | 7/1999 | Merritt et al. |
| 5,921,982 A | 7/1999 | Lesh et al. |
| 5,938,804 A | 8/1999 | Engel et al. |
| D414,544 S | 9/1999 | Ward et al. |
| 5,951,729 A | 9/1999 | Ernst et al. |
| 5,972,063 A | 10/1999 | Dudrey et al. |
| D416,308 S | 11/1999 | Ward et al. |
| 5,984,109 A | 11/1999 | Kanwar et al. |
| 6,004,366 A | 12/1999 | Engel et al. |
| 6,039,778 A | 3/2000 | Coulonvaux |
| 6,051,042 A | 4/2000 | Coulonvaux |
| 6,090,177 A | 7/2000 | Moessinger et al. |
| 6,099,606 A | 8/2000 | Miller et al. |
| 6,149,700 A | 11/2000 | Morgan et al. |
| 6,171,275 B1 | 1/2001 | Webster, Jr. |
| 6,258,145 B1 | 7/2001 | Engel et al. |
| 6,261,334 B1 | 7/2001 | Morgan et al. |
| 6,290,739 B1 | 9/2001 | Gieseke et al. |
| 6,322,602 B2 | 11/2001 | Engel et al. |
| 6,383,244 B1 | 5/2002 | Wake et al. |
| 6,391,076 B1 | 5/2002 | Jaroszczyk et al. |
| 6,398,832 B2 | 6/2002 | Morgan et al. |
| 6,402,798 B1 | 6/2002 | Kallsen et al. |
| 6,413,289 B2 | 7/2002 | Engel et al. |
| 6,416,561 B1 | 7/2002 | Kallsen et al. |
| 6,419,718 B1 | 7/2002 | Klug et al. |
| 6,436,162 B1 | 8/2002 | Wake et al. |
| 6,440,188 B1 | 8/2002 | Clements et al. |
| 6,447,567 B1 | 9/2002 | Ehrenberg |
| 6,485,535 B1 | 11/2002 | Linnersten et al. |
| D467,654 S | 12/2002 | Klug et al. |
| 6,521,009 B2 | 2/2003 | Engel et al. |
| D471,623 S | 3/2003 | Gieseke et al. |
| D475,129 S | 5/2003 | Ward et al. |
| 6,558,453 B2 | 5/2003 | Sepke et al. |
| 6,572,667 B1 | 6/2003 | Greif et al. |
| D477,659 S | 7/2003 | Gieseke et al. |
| 6,585,838 B1 | 7/2003 | Mullins et al. |
| 6,599,342 B2 | 7/2003 | Andress et al. |
| 6,602,308 B1 | 8/2003 | Carle et al. |
| D481,101 S | 10/2003 | Boehrs |
| 6,652,614 B2 | 11/2003 | Gieseke et al. |
| D485,339 S | 1/2004 | Klug et al. |
| 6,736,874 B2 | 5/2004 | Rieger et al. |
| 6,752,924 B2 | 6/2004 | Gustafson et al. |
| 6,837,920 B2 | 1/2005 | Gieseke et al. |
| 6,852,148 B2 * | 2/2005 | Gieseke et al. ............... 95/287 |
| D513,314 S | 12/2005 | Iddings et al. |
| 6,986,805 B2 | 1/2006 | Gieseke et al. |
| 7,070,642 B2 | 7/2006 | Scott et al. |
| 7,094,343 B2 | 8/2006 | Moessinger et al. |
| 7,115,156 B2 | 10/2006 | Schaerlund et al. |
| 7,291,198 B2 | 11/2007 | Gieseke et al. |
| 7,311,748 B2 | 12/2007 | Holmes et al. |
| 7,524,349 B2 * | 4/2009 | Schrage et al. ............... 55/502 |
| 7,537,631 B2 | 5/2009 | Scott et al. |
| 7,572,310 B2 | 8/2009 | Gieseke |
| 7,662,203 B2 | 2/2010 | Scott et al. |
| 7,981,186 B2 | 7/2011 | Schrage et al. |
| 7,988,757 B2 | 8/2011 | Scott et al. |
| 8,038,756 B2 | 10/2011 | Iddings et al. |
| 8,066,791 B2 | 11/2011 | Baseotto et al. |
| 8,163,056 B2 | 4/2012 | Coulonvaux et al. |
| 8,216,335 B2 | 7/2012 | Scott et al. |
| 2002/0014058 A1 | 2/2002 | Engel et al. |
| 2003/0051455 A1 | 3/2003 | Gieseke et al. |
| 2004/0134171 A1 | 7/2004 | Scott et al. |
| 2004/0261383 A1 | 12/2004 | Schaerlund et al. |
| 2006/0086075 A1 | 4/2006 | Scott et al. |
| 2008/0190082 A1 | 8/2008 | Scott et al. |
| 2009/0049814 A1 | 2/2009 | Baseotto et al. |
| 2009/0094951 A1 | 4/2009 | Baseotto et al. |
| 2009/0100813 A1 | 4/2009 | Iddings et al. |
| 2009/0145095 A1 | 6/2009 | Juliar et al. |
| 2009/0217632 A1 | 9/2009 | Coulonvaux et al. |

| | | | |
|---|---|---|---|
| 2010/0146917 A1 | 6/2010 | Coulonvaux et al. | |
| 2010/0146920 A1 | 6/2010 | Iddings et al. | |
| 2011/0308212 A1 | 12/2011 | Ruhland et al. | |

FOREIGN PATENT DOCUMENTS

| | | |
|---|---|---|
| EP | 0 230 991 A2 | 8/1987 |
| EP | 0 480 991 B1 | 4/1992 |
| EP | 0 562 502 | 9/1993 |
| EP | 1 216 743 | 8/2000 |
| EP | 1 123 460 B1 | 8/2003 |
| EP | 0 963 234 | 11/2004 |
| FR | 2 214 505 | 8/1984 |
| FR | 2 665 217 | 1/1992 |
| GB | 1 125 335 | 4/1919 |
| GB | 1 124 735 | 8/1968 |
| GB | 1 499 922 | 2/1978 |
| GB | 1 511 904 | 5/1978 |
| GB | 2 110 110 | 6/1983 |
| GB | 2 119 674 | 11/1983 |
| RU | 868082 | 9/1981 |
| WO | 98/11977 | 3/1998 |
| WO | 99/42719 | 8/1999 |
| WO | WO 2006/119414 | 11/2006 |

* cited by examiner

AIR CLEANER; AIR FILTER CARTRIDGE AND METHOD OF MANUFACTURING

This application is being filed on 1 Oct. 2009, as a National Stage of PCT International Patent application No. PCT/US2008/059137, filed 2 Apr. 2008 in the name of Donaldson Company, Inc., a U.S. national corporation, applicant for the designation of all countries except the US, and Douglas Lee Iddings, a citizen of the U.S., Jian Xu, a citizen of China, and Lloyd E. Weisert, and James Roland Scott, both citizens of the U.S., applicants for the designation of the US only, and claims priority to U.S. Provisional patent application Ser. No. 60/921,536, filed Apr. 3, 2007. To the extent appropriate, a claim of priority is made to each of the above disclosed applications.

FIELD OF THE INVENTION

The present disclosure generally concerns air cleaners with removable and replaceable (i.e. serviceable) filter cartridges. The particular techniques disclosed concern: preferred interactions between a filter cartridge and an air cleaner housing.

BACKGROUND

Air filtering is used in a variety of systems. A typical application is as an air cleaner for intake air in internal combustion engines. After a period of use, filter media within the air cleaner requires servicing, either through cleaning or complete replacement. Typically, for an air cleaner used with an internal combustion engine such as on a vehicle, filter media is contained in a removable, replaceable (i.e. serviceable) component, element or cartridge. Examples are shown in U.S. Pat. Nos. 4,211,543; 4,135,899; 3,672,130; B1 5,445,241; 5,700,304; 6,051,042; 6,039,778; 5,547,480; 5,755,842; and, 5,800,581; and, PCT publication WO 89/01818, the complete disclosures of all of these references being incorporated by reference.

Also, in: U.S. Provisional Application 60/699,136 filed Jul. 13, 2005; U.S. application Ser. No. 11/210,914 filed Aug. 24, 2005; Provisional Application Ser. No. 60/604,554 filed Aug. 25, 2004; U.S. Provisional Application Ser. No. 60/677,031, filed May 3, 2005; U.S. Publication 2004/0134171 A1, published Jul. 15, 2004; and PCT Publication WO 04/039476, published May 13, 2004, filter systems and filter cartridges are shown which have, among other things, unique interactions between the cartridge and the housing. The references in this paragraph are incorporated herein by reference, in their entirety.

Continued improvements have been ongoing, with respect to the designs of replacement part air filter cartridges, and air cleaners for receiving them. As improvements and refinements in the seal type and location are sought and obtained, desirable variations in air cleaner design and manufacture are also facilitated.

In this disclosure, improvements of certain systems described in U.S. patent application Ser. No. 11/415,528, published Nov. 16, 2006 as US Publication US06/254229 and PCT Application US06/17125, filed May 2, 2006, published as PCT Publication WO06/119414 published on Nov. 9, 2006, are made.

SUMMARY

A. Summary of Present Disclosure.

The present disclosure relates to improvements in arrangements described in U.S. Ser. No. 11/415,528, filed May 2, 2006, published on Nov. 16, 2006 as US Publication US06/254229. A corresponding PCT application US06/17125, filed May 2, 2006 and published on Nov. 9, 2006 as PCT Publication WO06/119414. The complete disclosure of each of these is incorporated herein by reference.

In general, the improvement relates to inclusion of a ring member in a housing end wall pressing against an end portion of a filter cartridge end cap.

Methods of assembly and use are also described.

It is noted that an arrangement could have less than all of the characterized features, and still be in accord with the present disclosure.

B. Summary of U.S. Ser. No. 11/415,528.

According to the disclosure of U.S. Ser. No. 11/415,528, air filter cartridges for use in an air cleaner, and an assembly comprising an air cleaner with an air filter cartridge therein, are described and shown. The air filter cartridges generally comprise a region of filter media surrounding and defining an open central interior and first and second end caps, the media extending between the first and second end caps. The first end cap is closed to flow of air therethrough. The second end cap is an open end cap having an annular outwardly directed housing radial seal surface thereon. The second end cap includes a groove therein preferably having a deepest portion spaced radially no more than 3 mm, typically no more than 2 mm, and sometimes no more than 1.5 mm from an adjacent outer edge of the filter media (radially inwardly or outwardly); and, no more than 15 mm, typically no more than 10 mm inwardly from an outermost part of the outwardly directed radial seal surface.

The groove is typically at least 0.5 mm deep, usually at least 1.0 mm deep and typically at least 1.5 mm deep in minimum depth from a nearest or closest adjacent outer axial surface portion of the end cap. In instances shown herein, the groove is at least 2.5 mm deep from the closest adjacent outer axial surface of the second end cap, and usually at least 3.5 mm deep from the closest adjacent outer axial surface.

Sometimes the deepest part of the groove is spaced no more than 1.0 mm from an adjacent outer edge of the media (radially inwardly or outwardly).

The filter cartridge typically includes an outer support having a portion surrounding the media and projecting into the second end cap. The second end cap is typically a molded-in-place end cap with a portion of the outer support surrounding the media projecting into the second end cap.

The tip of the outer support projecting into the second end cap is typically positioned an actual distance of at least 0.2 mm and not more than 1.5 mm, usually not more than 1.2 mm, from the deepest portion of the groove. Typically, the spacing is within the range of 0.3-1 mm inclusive.

The typical outer support includes a radially outwardly directed dust shield or flange thereon at a location adjacent the second end cap.

The typical groove within the second end cap has an asymmetric V-shaped or U-shaped cross-section with a radially outer side and a radially inner side. The inner side typically has a portion extending at an acute angle with respect to a central axis of the media (or a cylinder parallel to the central axis of the media), within the range of 20°-40°, inclusive. The outer side typically extends at an angle with respect to the inner side within the range of 20°-40°, inclusive. Typically the outer side has a portion extending generally parallel to a central axis of the media. By the term "asymmetric" in this context, it is meant that typical applications of the two sides of the v do not extend at the same angle, relative to a central axis of the media and filter cartridge.

Alternately stated, the inner side of the groove typically extends at an acute angle of 50-70°, relative to a plane perpendicular to the media central axis. This is shown in FIG. 9 at angle DA and in FIG. 20 at angle GA.

The second end cap includes an inner axial surface portion and an outer axial surface portion separated by the groove. The inner axial surface portion at a location immediately adjacent the groove typically has an axial extension beyond a portion of the outer axial surface portion, immediately adjacent the groove. Alternately stated, the depth (thickness) of the second end cap beyond a plane at an end of the media pack in the inner axial surface portion is typically greater than it is at the outer axial surface portion. Typically the inner axial surface portion and the outer axial surface portion are each planar.

The media is typically pleated. In some instances the media is configured to define a conical shape with an outside conical angle of at least 0.5°, typically 1°-5°, inclusive, for example 1.5°-3.0°, inclusive. A wider end or greater perimeter end of the media, would typically be a portion adjacent to (or embedded in) the second end cap.

In an example shown, the outer support surrounds the filter media and extends completely between first and second end caps, although alternatives are possible. The outer support in the example shown includes an air impermeable shield portion adjacent the second end cap and projecting toward the first end cap, from the radial dust shield, a distance corresponding to at least 10% and not more than 40%, typically not more than 30%, of a distance between the first and second end caps.

According to the disclosure of U.S. Ser. No. 11/415,528 an air cleaner arrangement is provided which includes a housing having an interior including on inlet and end outlet. The housing includes an end wall surrounding the end outlet and an annular housing seal surface surrounding the defined end wall. The housing includes a wall stabilizing ring projecting a distance of at least 2 mm, typically at least 2.5 mm, and usually not more than 10 mm, typically not more than 7 mm into the interior of the housing from the end wall. The wall stabilizing ring is spaced from both the end outlet and the annular radial seal surface. The wall stabilizing ring can be a segmented ring.

The air cleaner includes an air filter cartridge of the general type described above openably positioned therein, with the groove of the second end cap oriented with the wall stabilizing ring projecting at least partially therein; i.e., to a position adjacent at least one of the sides of the groove. The cartridge is sealed to the housing, by the outer, annular, outwardly directed housing radial seal portion engaging the annular housing seal surface.

BRIEF DESCRIPTION OF THE DRAWINGS

A. Drawings from U.S. Ser. No. 11/415,528.

B. Additional Drawings Relating to Improvements Made to Arrangements Disclosed in U.S. Ser. No. 11/415,528.

Figure 24:
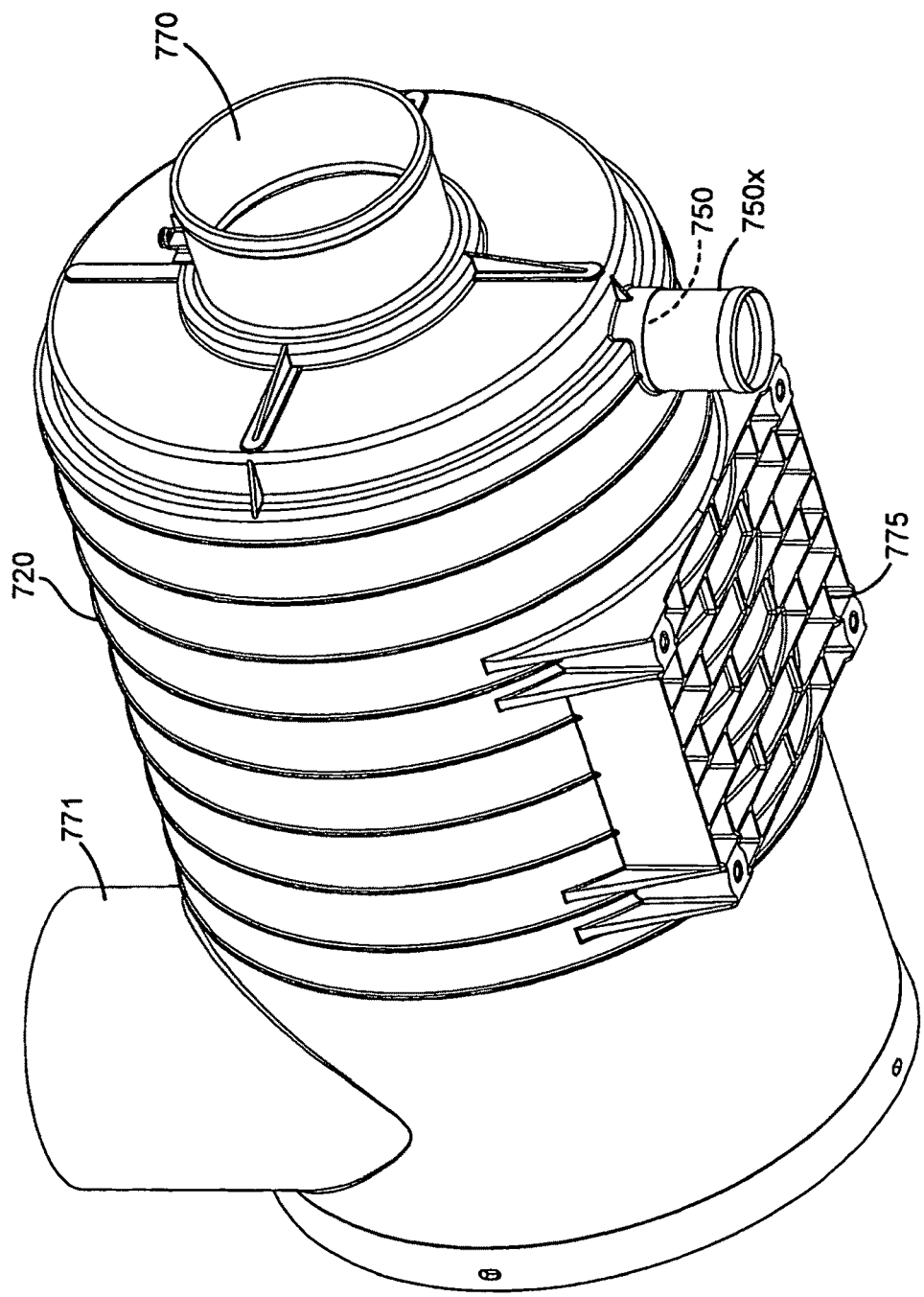

FIG. 24 is a schematic, bottom perspective view of a housing section of an air cleaner assembly in accord with the present disclosure.

Figure 25:
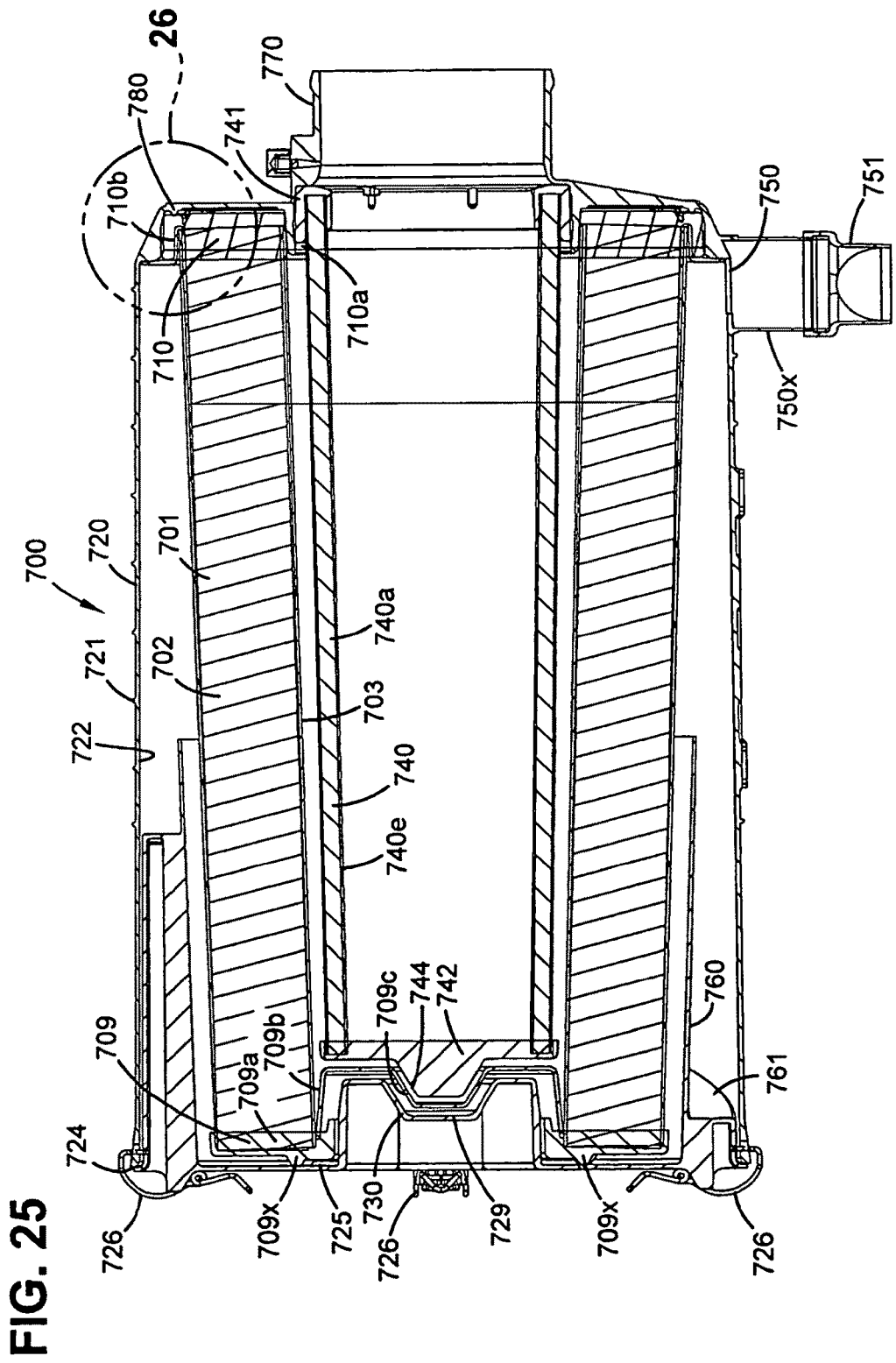

FIG. 25 is a schematic, side cross-sectional view of an example air cleaner assembly in accord with the present disclosure.

Figure 26:
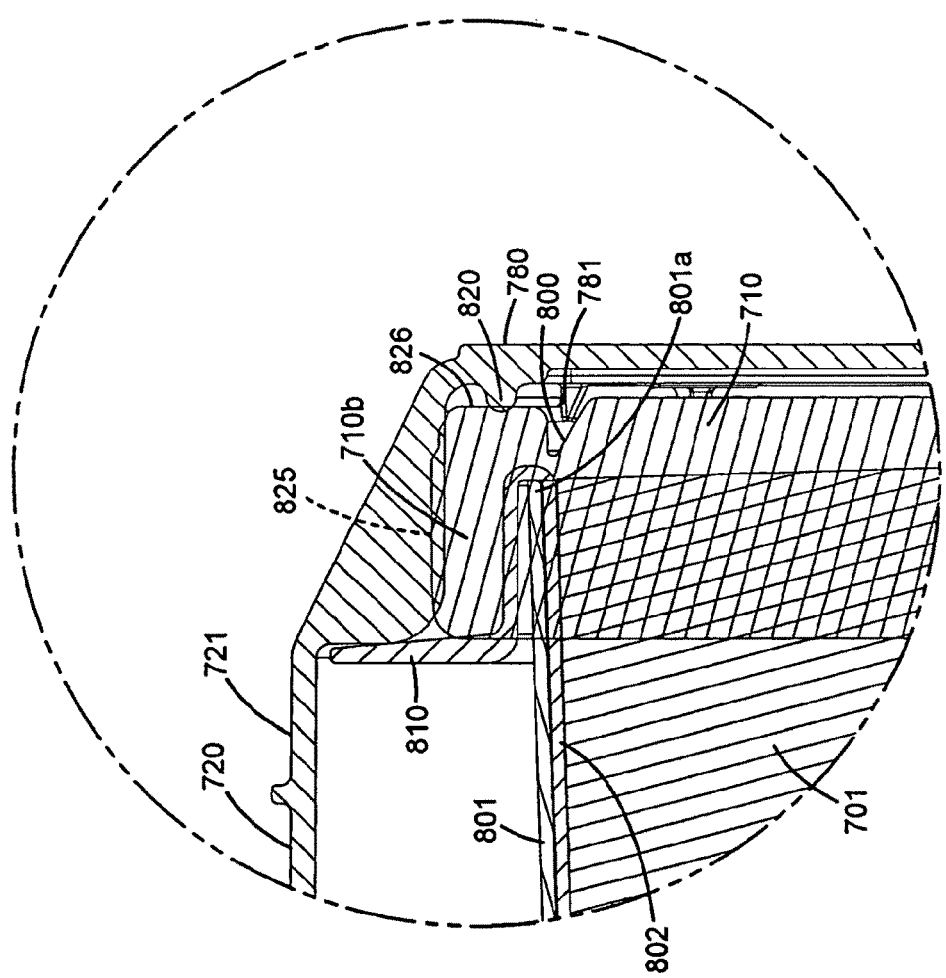

FIG. 26 is a schematic, enlarged fragmentary view of a portion of FIG. 25.

Figure 27:
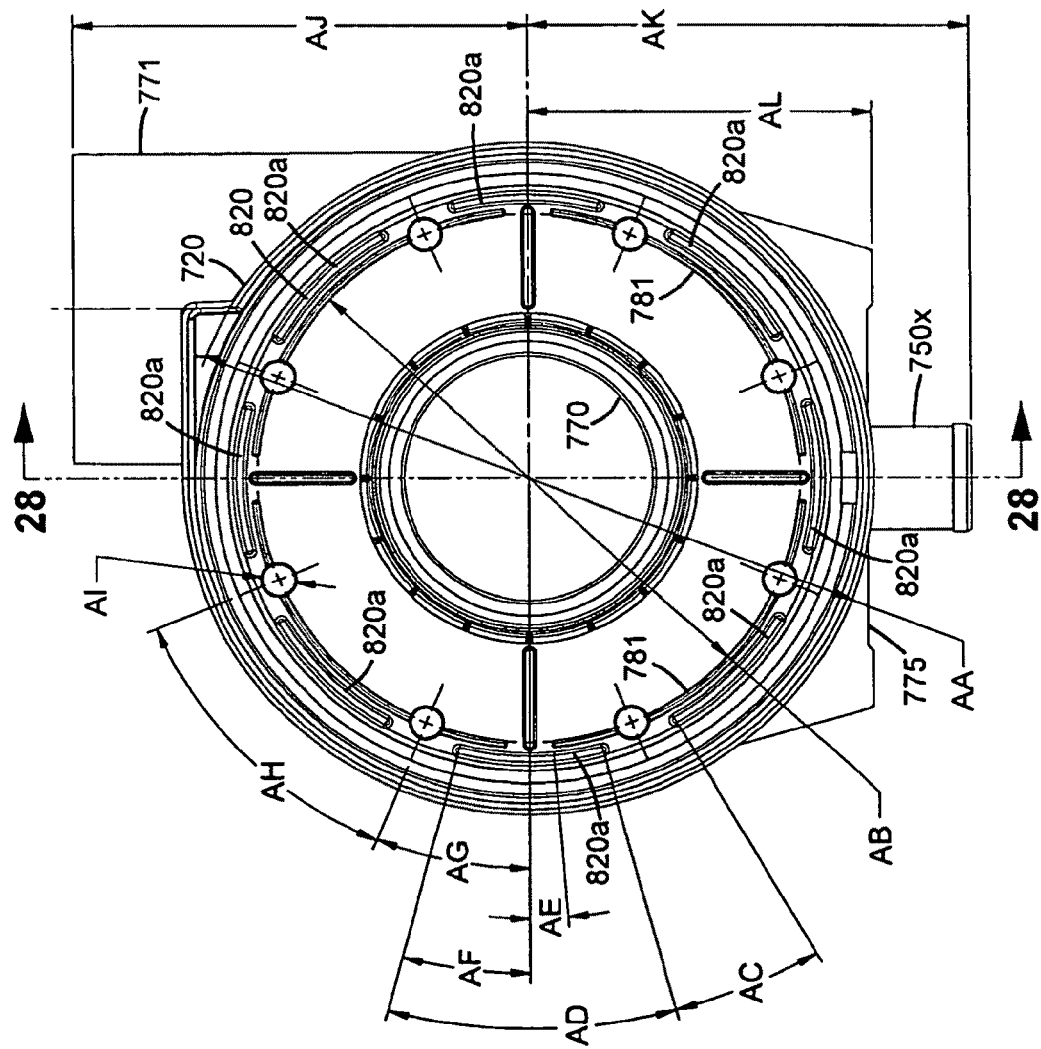

FIG. 27 is a schematic, end view of an air cleaner housing section of FIG. 24, the end view being taken toward an open end thereof.

Figure 28:
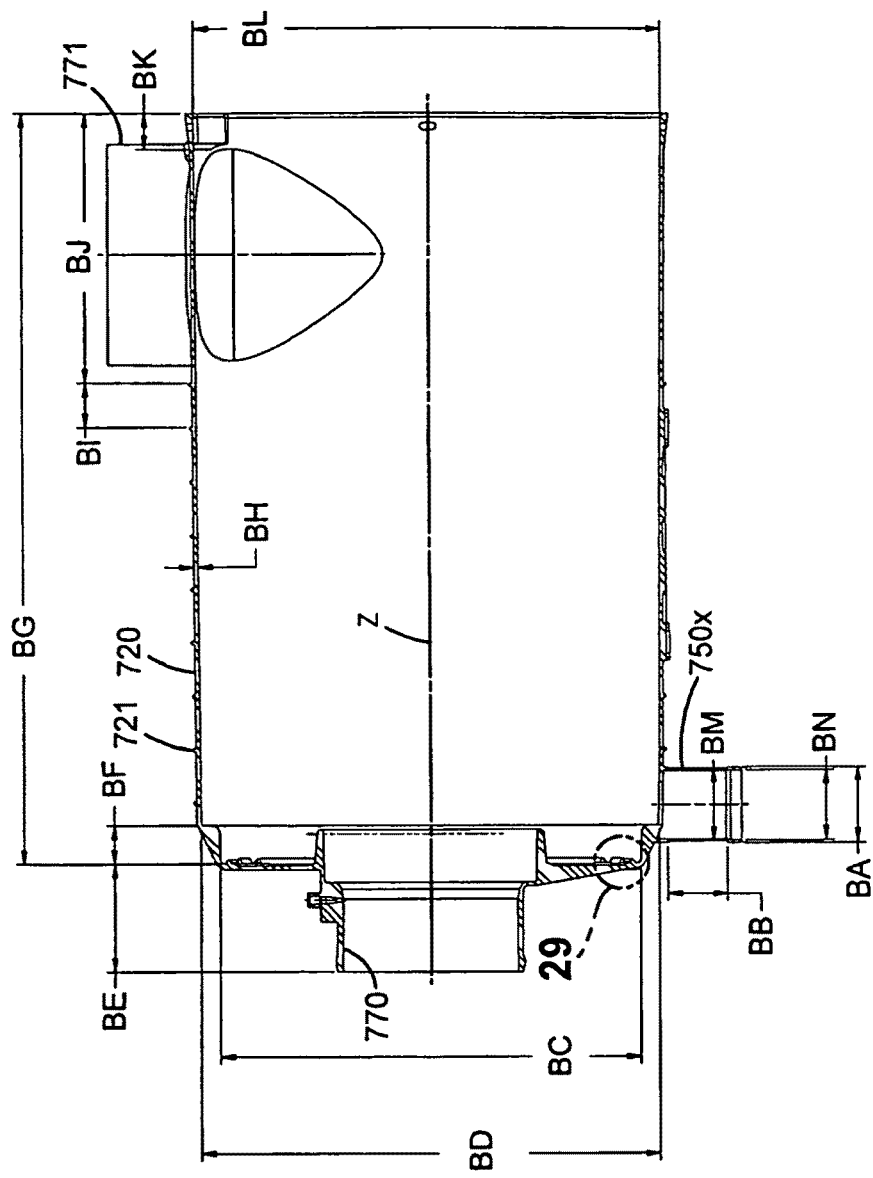

FIG. 28 is a schematic, cross-sectional view of the housing section depicted in FIG. 27, taken along line 28-28 thereof.

Figure 29:
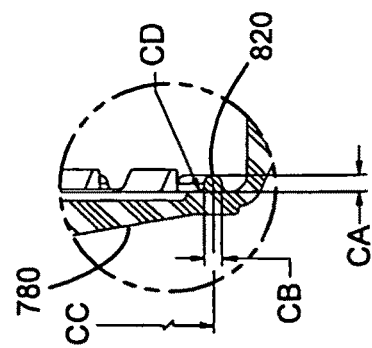

FIG. 29 is a schematic, enlarged fragmentary view of a portion of FIG. 28.

DETAILED DESCRIPTION

As mentioned previously, the present disclosure relates to improvements in arrangements described in U.S. Ser. No.

11/415,528, filed May 2, 2006 and published Nov. 16, 2006 as US06/254229; a corresponding PCT application being published Nov. 9, 2006 as PCT Publication WO06/119414. The complete disclosure of each of these applications and publications is incorporated herein by reference.

The disclosure of U.S. Ser. No. 11/415,528 serves as background information, with respect to the techniques described herein as improvements. FIGS. 1-23, and the descriptions herein under sections I-VIII are features and techniques described in U.S. Ser. No. 11/415,528. In Section IX, improvements relating to FIGS. 24-28 and applicable to the previous figures are described.

I. General Features of Selected Advantageous Replacement Part Air Filter Cartridges described in U.S. Ser. No. 11/415,528.

As indicated previously, the disclosure of U.S. Ser. No. 11/415,528 concerns certain advantageous filter cartridges, methods of manufacturing them, and assemblies which utilize cartridges having features according to the preferred methods of manufacture.

The features of air filter cartridges described in U.S. Ser. No. 11/415,528 are generally developed for use with air cleaners for cleaning combustion air in equipment that utilize internal combustion engines, such as vehicles. While the principles could be applied in other air cleaner systems, they were particularly adapted for use with vehicle systems that are, in general, subject to: substantial equipment vibration during use; potential wide temperature variations; and a need for air cleaner efficiency levels of the type required by engine manufacturers and vehicle manufacturers, for such systems.

A wide variety of features are known for inclusion in such air filter cartridges. Air filter cartridges of concern to the disclosure of U.S. Ser. No. 11/415,528 generally include the following two general features:

1. A media arrangement configured around an open central interior; and
2. A cartridge end cap with a housing seal.

Herein the term "housing seal" is meant to refer to a seal (carried by the filter cartridge), of a type and at a position for forming a seal with a housing of an air cleaner, during installation. The housing seal is generally positioned attached to the cartridge and, in use, is located at an interface between the filter cartridge and the housing, to separate the clean air side and the dirty air side of the filter cartridge, within the housing. There are two general types of housing seal arrangements: (a) radial seal, and (b) axial seal. A radial housing seal is generally a seal that operates under compressive forces directed radially, i.e., toward or away from a center or central longitudinal axis of the filter cartridge. An axial housing seal is generally one which operates under compressive forces or sealing forces directed axially, i.e., in a direction parallel to a longitudinal axis of a filter cartridge. The cartridges described and depicted herein use housing seals of the radial seal type.

An example of a filter cartridge that includes the general features of a radial seal, is shown in U.S. Pat. No. 5,547,480 at FIG. 2. In that example, the media is pleated, there is support structure on both the inside of the media and the outside of the media; and, a housing seal in the form of a radial seal is an inside radial seal positioned surrounding an interior aperture of a molded-in-place end cap. With such an arrangement, the end cap including the housing seal feature is generally molded from a polymer, typically foamed polyurethane.

In U.S. Pat. No. 6,652,614 at FIG. 7, another example of such an arrangement is shown, this time with no outside media support liner.

In U.S. Provisional Application 60/604,554, filed Aug. 25, 2004 and U.S. Provisional Application 60/677,031, filed May 3, 2005, among other things, examples of such arrangements are shown in which: the filter cartridge carries no inner liner that extends the length of the media pack, the filter cartridge comprises pleated media arranged around an open central volume, and an open end cap is formed as a molded-in-place polyurethane foam end cap with a housing seal. An example of a cartridge with many similar features is shown herein in FIG. 1. The cartridge of FIG. 1, however, is made in accord with selected preferred methods and features described in U.S. Ser. No. 11/415,528, and when used is installed in a housing with preferred cartridge interactive features of the housing as described in U.S. Ser. No. 11/415,528.

Figure 1:
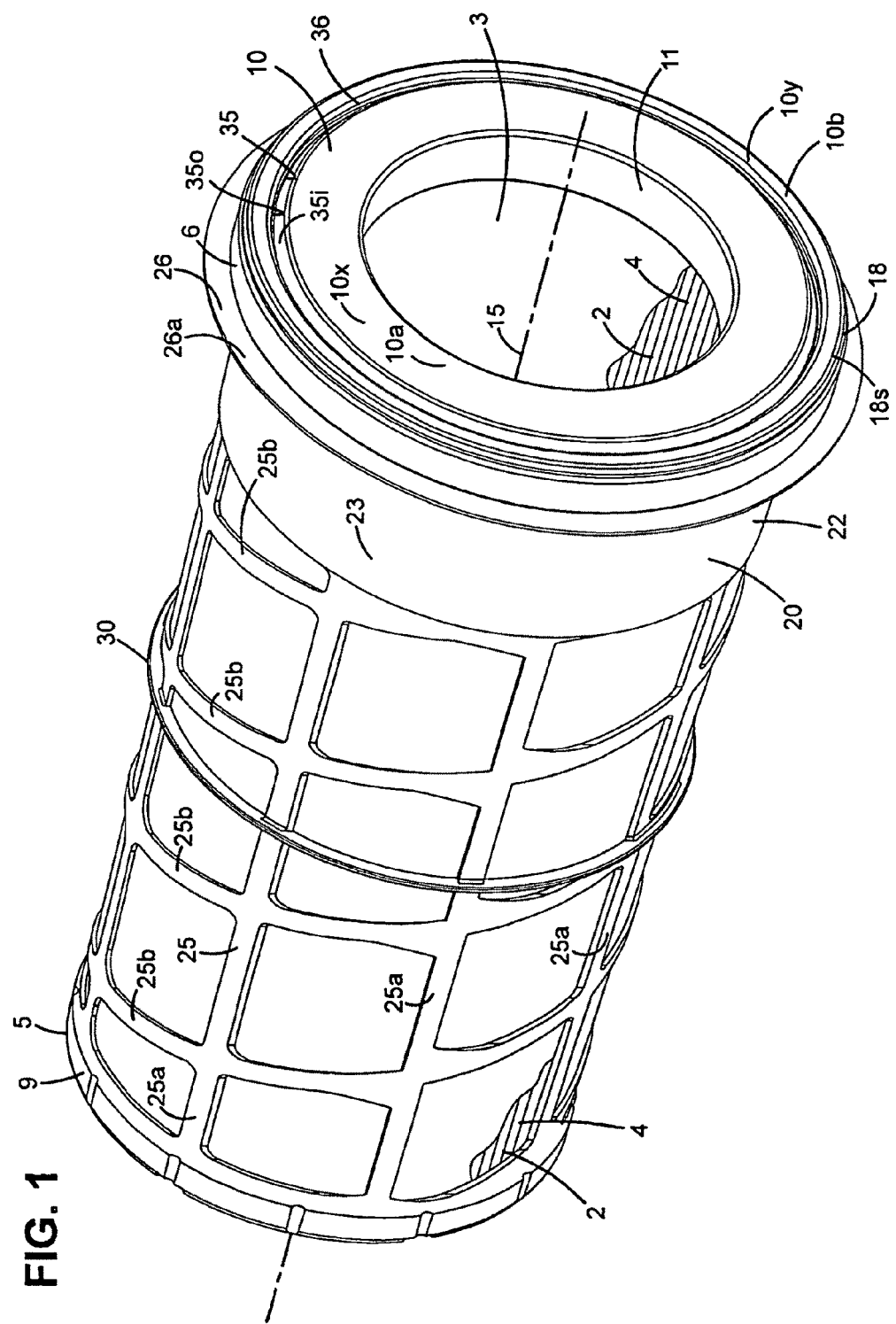
FIG. 1 is a schematic perspective view of an example air filter cartridge including features according to the disclosure of U.S. Ser. No. 11/415,528.

Referring to FIG. 1, the reference number 1 depicts a replacement service part filter cartridge. The filter cartridge 1 comprises media 2 arranged, in this example, and preferably symmetrically, generally around an open central volume 3. The media 2 may be of any of a variety of types. The example media 2 depicted comprises pleated media 4, with longitudinal pleat length extending between opposite ends 5 and 6 of the cartridge 1. When pleated media is used, a pleat depth of at least 15 mm, for example 15 mm-70 mm, often 20-60 mm, will be typical, although alternatives are possible.

The media 2 may be configured in a variety of possible ways including, for example, as a cylinder or as a cone. An example of a conical arrangement is described herein. However with respect to application of many of the principles described in U.S. Ser. No. 11/415,528, the exterior shape of the cartridge (for example conical or cylindrical) is not of specific concern.

For typical filter cartridges 1 of the type characterized in FIG. 1, at end 5 a closed end cap 9 is provided. By the term "closed" in this context, it is meant that the end cap 9 is closed to the passage of unfiltered air therethrough.

At opposite end 6, typically an open end cap 10 is provided. The term "open" in this context is meant to refer to an end cap 10 which includes a central aperture 11 therein providing for air flow communication between interior 3, and a region exterior to the cartridge 1, without passage through the media of the filter cartridge 1.

With filter cartridges of the type generally of concern to U.S. application Ser. No. 11/415,528, the open end cap 10 has a housing seal associated with it. In use, the housing seal engages a portion of an air cleaner housing to prevent air from bypassing the media 2, (during air cleaner operation), to undesirably mix with filtered air exiting interior 3 through aperture 11, when the arrangement is operated with forward flow. By "forward flow" in this context, it is meant that the air during filtering flows from outside of the media 2 to an interior 3 of the media 2. Of course the techniques described could be applied in connection with some "reverse flow" arrangements, in which air during filtering passes from interior 3 through the media 2. In this latter instance, the housing seal would have the same general operation, i.e., separating regions of filtered air from regions of unfiltered air, but the specifics (which region is filtered and which is unfiltered) would be reversed.

A central axis for the cartridge 1 and media 2 is depicted at 15. For the filter cartridge 1 depicted in FIG. 1, the housing seal is a "radial seal." The housing seal, being a radial seal, is formed by pressure of a housing portion against a portion of seal material, generally directed toward or away from central axis 15.

For cartridges of the general type discussed in connection with FIG. 1 that have radial seals, there are two general types of radial seals. The first is an "outside" or "outwardly directed" radial seal. Cartridge 1, FIG. 1, includes such an outside radial housing seal located at 18. An outwardly directed radial housing seal is generally one that circumscribes an outer periphery of the end cap 10, and is positioned with radial seal surface 18s oriented to engage an annular (surrounding) side of a matching seal surface of a housing, when installed for use. Typically, an outwardly directed radial housing seal surrounds a rigid support, which ensures controlled compression. Such a seal support is used for the example of FIG. 1, as discussed below.

Another type of radial seal is an inside or inwardly directed radial seal. In some instances, such seals are located around an interior of a central aperture in the end cap, to seal around a housing surface (or tube) in use. Such arrangements are shown, for example, in U.S. Pat. No. 5,547,480, as mentioned above.

In many instances, the end cap 10 and housing seal 18 are molded-in-place together from a polyurethane resin which is foamed and rises during cure. Typically when such is the case, the resin is formulated to increase in volume, after initial dispensing, by at least 50% typically at least 80% and often 90% or more, for example 90%-110%. In typical applications, such foamed polyurethane is formulated to form a cured material which has an as-molded density (in a free-rise test sample) for example of no greater than 28 lbs/cu.ft. (450 kg/cu.m), typically no greater than 22 lbs/cu.ft (355 kg/cu.m.) and often within the range of 12-17 lbs/cu.ft., inclusive (192-225 kg/cu.m.). Typically the end cap is formed from a resin which, in a test sample, and typically in the product, has a hardness, Shore A, of no greater than 25 typically no greater than 20, usually within the range of 10-20, inclusive, although alternatives are possible.

Polyurethane systems that are usable to form such arrangements are available from polyurethane suppliers such as BASF of Wyandotte, Mich., 48192. Examples of useable materials are described in PCT Publication WO 05/63361, published Jul. 14, 2005 and US Publication 2004/0134171, published Jul. 15, 2004, incorporated herein by reference.

Control of urethane flow during rise and cure can be a significant concern. If sufficient control of urethane rise during the molding process is not undertaken, excess flash can result in undesired locations; and, in some instances, mechanical parts of the cartridge set within the mold during the molding operation, can be undesirably dislocated by the rising, flowing, polyurethane.

In many instances, it is desired that the air cleaner housings are constructed of relatively lightweight plastic or sheet metal. It is important to ensure that the region of the housing for engagement with the end of the filter cartridge having the end cap, is stable and secure, to ensure that seal locations and tolerances are maintained. Issues with respect to this, and certain examples, are described herein below.

Techniques described in U.S. Ser. No. 11/415,528, among other things, relate to improved structures of filter cartridges, and improved structures of air cleaner housings for advantageous interaction. Manufacturing techniques to facilitate construction of the filter cartridge structures are also described.

II. Further Features of the Filter Cartridge of FIG. 1 of U.S. Ser. No. 11/415,528.

Referring to FIG. 1, an outer support 20 is provided encircling the media 2. The outer support 20 includes an end, not viewable, embedded within end cap 10. The support 20 further includes a region 22 adjacent to end cap 10 and projecting axially therefrom toward opposite end cap 9. By "projecting axially" in this context, it is meant that a portion of region 22 projects from end cap 10 in a direction generally parallel to axis 15 and toward end 5 (and opposite end cap 9) of the filter cartridge 1.

In contrast, it is noted that the cartridge 1 in the example of FIG. 1, includes no inner liner along the inside of the media 2, in region 3, extending between end caps 9, 10. Although alternatives are possible, such a construction will be typical for certain applications according to the disclosure of U.S. Ser. No. 11/415,528 especially those having a radial seal outside diameter of 9 inches (229.6 mm) or less. The support 20 is typically a molded plastic preform, although alternate materials from plastic) are possible. By "preform" in this context, it is meant the support 20 is prepared as a component to be included in the cartridge 1 before cartridge manufacture.

For the example shown in FIG. 1, region 22 of support 20 includes a shield section 23 which is imperforate (i.e., impermeable to air flow therethrough) and extends a distance of at least 25 mm, typically at least 35 mm and usually at least 40 mm toward end 5, from end cap 10. Typically the shield section 23 does not extend over more than 40% of the distance between end caps 10, 9. Usually shield section 23 does not extend more than 30% of that distance. Typically shield 23 does extend over at least 10% of that distance.

Although alternatives are possible, the particular support 20 depicted further includes: perforate screen section 25, a radially outwardly directed support flange 26; and, a portion, discussed below, embedded within end cap 10 as a rigid back-up to seal 18.

For the example shown, the perforate screen section 25 extends from shield section 23 to a position embedded in end cap 9 of the filter cartridge 1. The perforate screen section 25 preferably extends over a distance of at least 50% of the axial length of the cartridge 1, between end caps 10 and 11, and typically at least 60% of that length.

In a typical example, the support 20 would include a portion integral with perforate screen section 25, that extends across an end of the media at end 9.

The perforate screen section 25 is typically at least 50% open, usually at least 70% open. The term "open" in this context is meant to refer to the amount of area defined by screen section 25, which is open to passage of air therethrough. For the example shown, screen section 25 comprises spaced axial ribs 25a, interconnected by coils 25b.

Radially outwardly directed flange or support 26 provides for a support during a molding operation end cap 10, as discussed below. The particular support 26 is a continuous, imperforate, ring surrounding the cartridge 1, although alternatives are possible. The particular continuous ring configuration described, also provides for a preferred dust shield function in a particular type of housing arrangement, discussed below. The support 26 typically projects radially outwardly from shield section 23 a distance of at least 5 mm, typically 6-30 mm, inclusive, although alternatives are possible.

Still referring to FIG. 1, it is noted that cartridge 1 includes an optional central, radially outwardly directed, flange 30. This flange 30 is an integral portion of support 20 and provides for convenient handling, during typical manufacturing operations, but is not directly related to issues of specific concern herein.

Referring to FIG. 1, end cap 10 is provided with a groove 35 therein. The particular groove 35 depicted, is a continuous, circular groove 36 which circumscribes aperture 11, and is spaced therefrom toward radial seal area 18. For the particular example shown, the groove 35 is positioned between a central or inner ring portion 10a of end cap 10, and an outer ring portion 10b. For the particular cartridge 1 depicted, outer axial surfaces 10x, 10y of regions 10a and 10b respectively are each substantially planar but do not lie in the same plane, rather region 10b is recessed toward end 5, from surface 10a, typically a distance of at least 0.5 mm, often a distance within the range of 0.5-3.5 mm, inclusive.

Alternately stated, region 10a defines an inner axial surface portion 10x, and region 10b defines an outer axial surface portion 10y. The inner axial surface portion 10x, at a location immediately adjacent the groove 35, has an axial extension beyond a portion of the outer axial surface portion 10y that is also immediately adjacent the groove 35. In still a further alternate statement, region 10x is thicker, in axial depth from a plane corresponding to an end of embedded media 2, than is region 10y.

Groove 35 is configured and positioned for preferred engagement with a housing component. Further, groove 35 is an artifact from a preferred method of manufacture of end cap 10, in a manner that controls resin flow and rise during formation of end cap 10.

The groove 35 is typically positioned with a deepest part (inside end) in axial overlap either with an end of media 2, and end of support 20, or a location between the two. By "axial overlap" in this context, it is meant that a deepest portion (innermost tip) of the groove 35 is positioned axially adjacent to one of the features described and is typically not spaced radially outwardly from support 20 or radially inwardly of media 2.

Groove 35 is typically positioned with a deepest portion either overlapping the outermost 3 mm of the media 2 or overlapping an embedded tip of the support 20. That is, the groove 35 is positioned with a deepest portion spaced radially interiorly (if at al) from an outermost portion of the media edge to which it is adjacent, no more than 3 mm. Typically groove 35 is positioned with a deepest portion based no further from 2 mm, and often no more than 1.5 mm, radially inwardly, from an outermost portion of a media edge to which it is adjacent. Of course the deepest portion of the groove 35 can be positioned radially outwardly from the outermost portion of the media edge to which it is present, for example in axial overlap with a tip of the support 20. Typically, when spaced radially outwardly from the media, the innermost portion of the groove is still spaced radially no more than 3 mm, typically no more than 2 mm and often no more than 1.5 mm, in this instance radially outwardly, from an outer edge of the media.

The innermost or deepest part of the groove 35 is typically spaced from the outermost portion of the outer radial seal surface 18s, a distance of no greater than 15 mm, often no greater than 13 mm, in the cartridge 1 prior to installation, i.e., when the surface 18s is not distorted by sealing compression.

Figure 2:
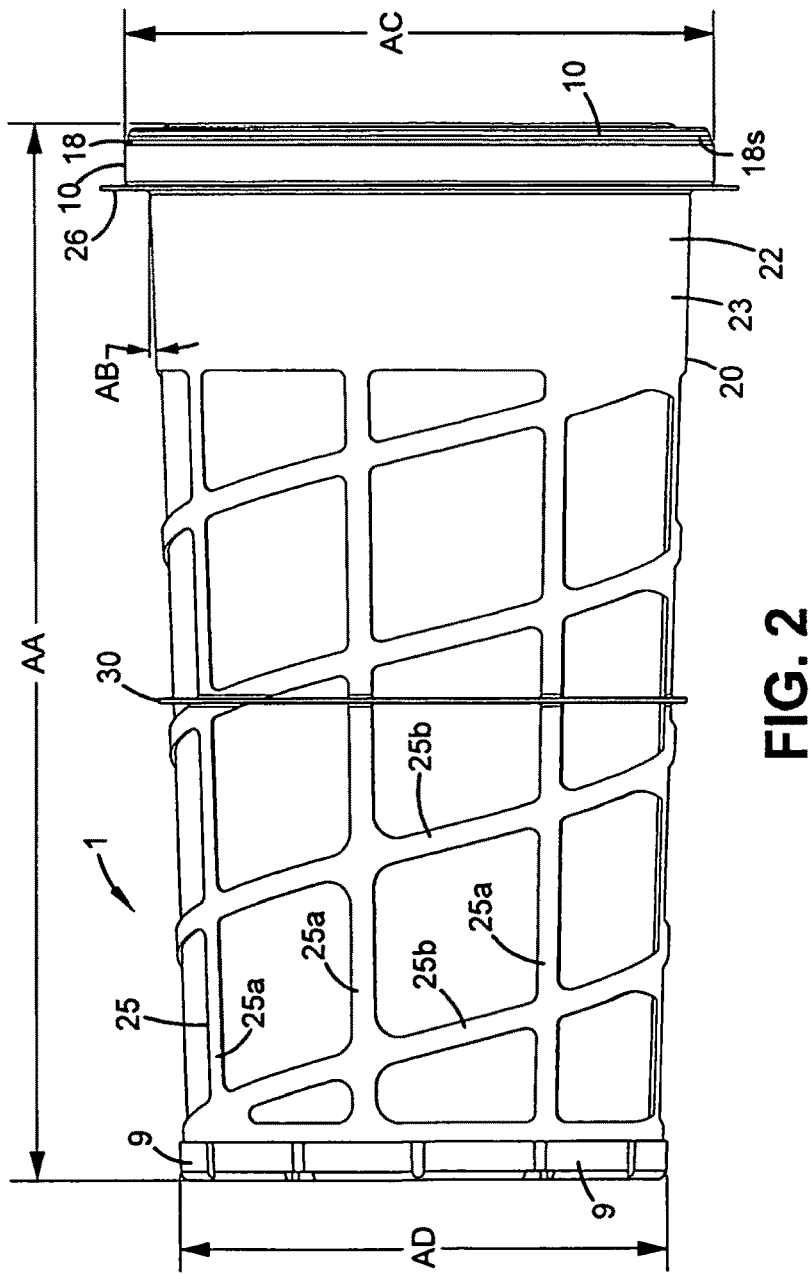
FIG. 2 is a side elevational view of the filter cartridge depicted in FIG. 1.

In FIG. 2, the side elevational view of the cartridge 1 is depicted. It is noted from a review of FIG. 2, that the example cartridge 1 decreases in outside diameter, in extension of the media from end caps 10 toward end cap 9. This angle, indicated generally at AB, is usually at least 0.5°, typically at least 10 and typically not more than 5°, often within the range of 1.5-3.0°, inclusive. As a result, the cartridge 1 is conically shaped, and angle AB is the conical angle for both the media 2 and the support 20.

Figure 3:
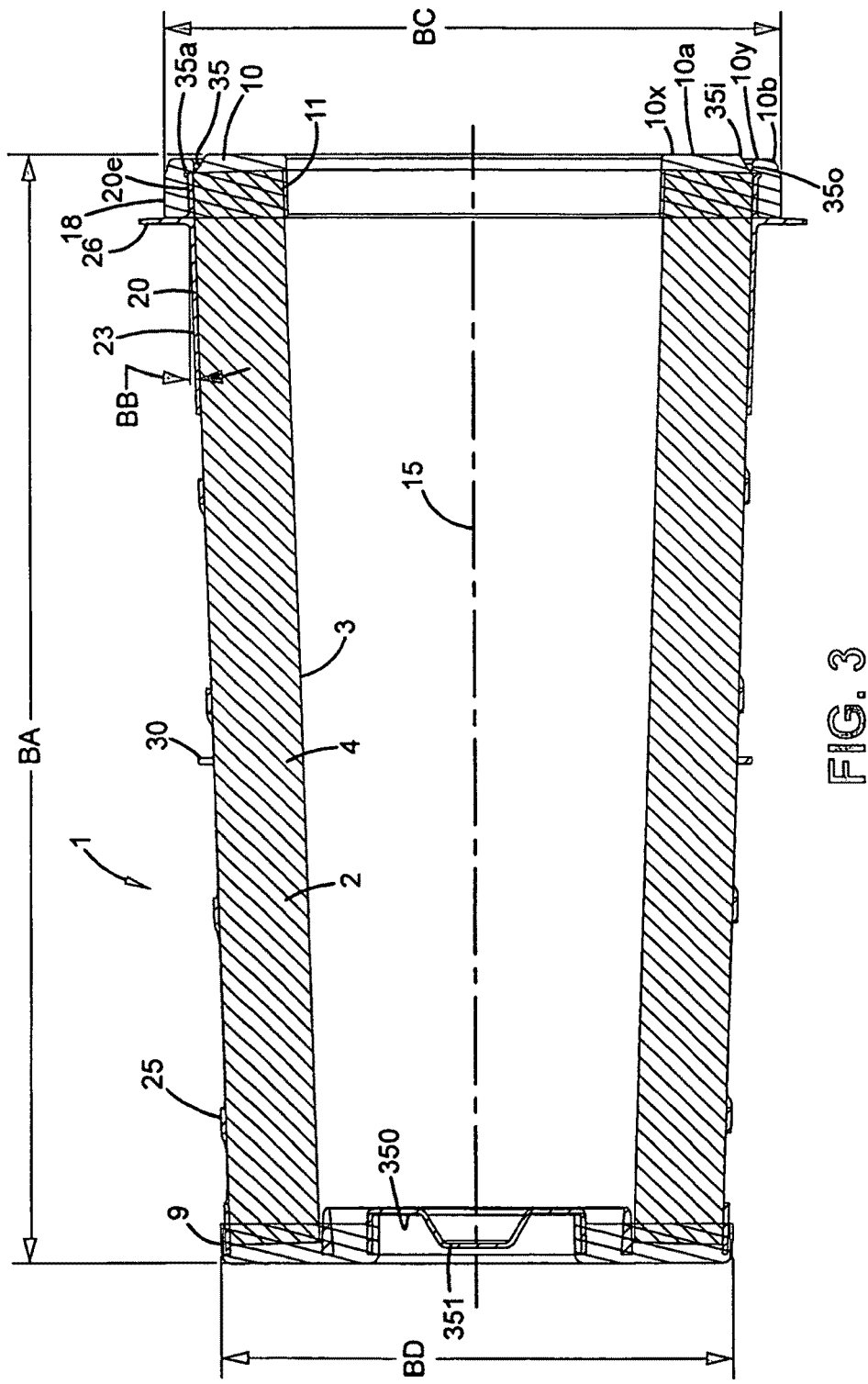
FIG. 3 is a schematic cross-sectional view of the filter cartridge depicted in FIGS. 1 and 2.

In FIG. 3 the cartridge 1 is depicted in cross-sectional view, and the features discussed can be viewed. Note the position of the groove 35 with an innermost or bottom portion 35a located in axial overlap with a radially outer portion of the media 2. Also note region 20e, of support 20, embedded with end cap 10, providing a compression back-up for seal 18.

In FIGS. 2 and 3, the dimensions indicated, for an example arrangement, are as follows: AA=358.9 mm; AB=1.8°; AC=195.3 mm; AD=161.6 mm; BA=358.9 mm; BB=1.8°; BC=195.3 mm; and BD=161.6 mm.

III. Manufacture of End Cap 10.

Figure 4:
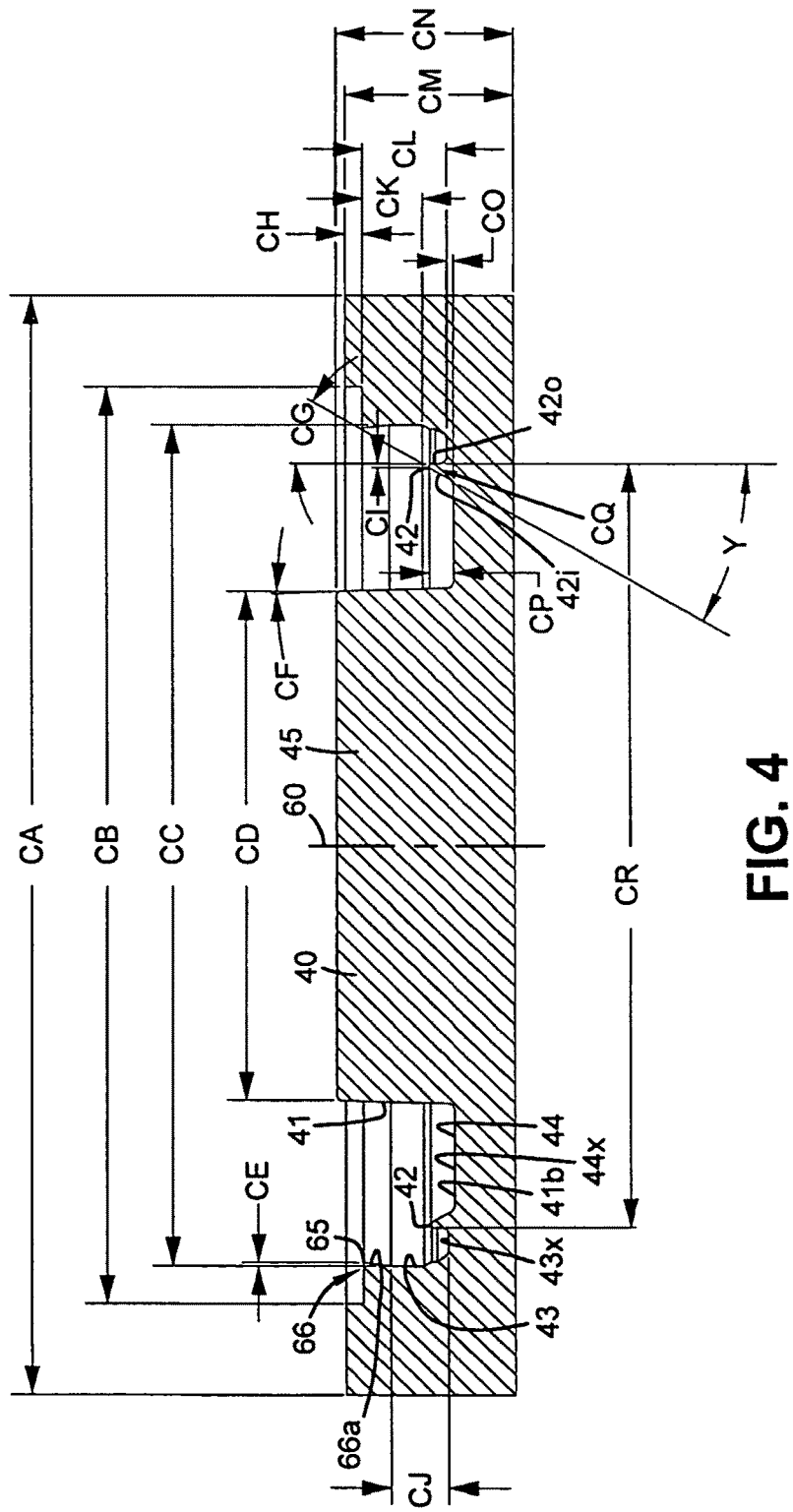
FIG. 4 is a schematic cross-sectional view of a mold arrangement usable to form a housing seal and end cap including a portion of the filter cartridge of FIG. 1.

In FIG. 4, a schematic cross sectional view of a mold portion 40 for use in molding end cap 10, FIG. 1, (by a convenient process) from a polyurethane resin that rises during cure, is shown. In FIG. 4 example dimensions are indicated by letters. The dimensions are identified below and are example dimensions, for an example application of techniques according to the disclosure of U.S. Ser. No. 11/415, 528. The principles of the disclosure of U.S. Ser. No. 11/415, 528 can be applied in alternate applications, with alternate dimensions and with alternate molds.

Referring to FIG. 4, the mold 40 generally comprises a ring shaped mold cavity 41 with a bottom 41b that has a circular, upwardly projecting, central bottom ridge 42 therein, positioned to form groove 35 in the end cap 10, FIG. 1. The ridge 42 separates the mold cavity 41 into two regions: radially outer ring region 43 and radially inner ring region 44. The outer region 43, as discussed further below, is positioned and configured to form the outside radial seal region 18 (and radial seal surface 18s) of end cap 10, FIG. 1; i.e., end cap region 10b. The inner region 44, as discussed below, is positioned and configured to form inner or central region 10a and central aperture 11 in end cap 10, FIG. 1.

Still referring to FIG. 4, mold 40 includes a central projection or post 45. The central projection 45 is sized and configured to define aperture 11, in a resulting end cap 10, FIG. 1. During a molding operation, media 2 will be positioned surrounding central projection 45, so that as polymer rises sufficiently to engage the media 2 and cure, the resulting end cap 10 will secure the media and provide open central aperture 11 at this location.

Figure 5:
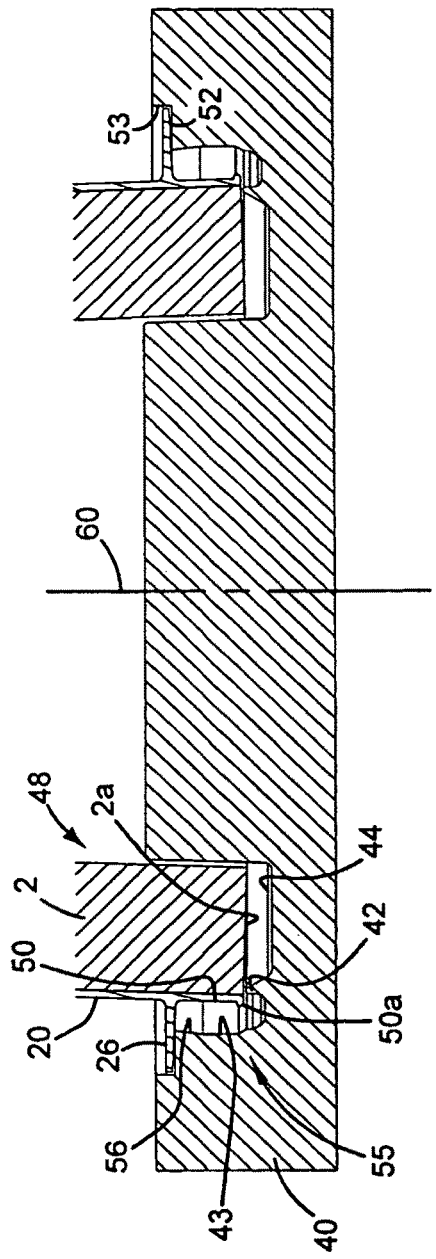
FIG. 5 is a schematic cross-sectional view of the mold of FIG. 2, depicting, in fragmentary, components of a filter cartridge positioned therein for a molding process.

Attention is now directed to FIG. 5. In FIG. 5 the mold 40 is depicted engaged by portions of a media pack 48 (including media 2 and support frame 20), as it would be during an operation of molding a mold-in-place end cap 10 of a filter cartridge similar to cartridge 1, FIG. 1. It is noted that in FIG. 5, the mold 40 is depicted schematically and without uncured liquid resin 49 poured therein. Typically, before portions of a media pack 48 are inserted into mold 40 for molding, an appropriate volume of curable resin will have been positioned in a mold, at an appropriate location for desirable cure. The particular amount of uncured resin that would be included in any given molding operation, is a function of the mold configuration and resin characteristics.

Still referring to FIG. 5, the portions of media pack 48 extending into the mold 40 comprise portions of media 2 and portions of outer support 20. For the particular example shown, since filter cartridge 1 (FIG. 1) is to be made, the support 20 circumscribes the media 2. As indicated previously, variations from filter cartridge 1 are possible. However, since filter cartridge 1 is to be made in mold 40, FIG. 5, it is noted that there is not an inner liner positioned along an inside of the media pack 48.

Referring to FIG. 5, at 50 a portion of support 20 is depicted which surrounds media 2 and will eventually (after cure) project into end cap 10 (as end 20e, FIG. 1).

Referring still to FIG. 3, mold 40 is configured with a shelf 52 thereof surrounded by a wall 53. The shelf 52 is configured to be engaged by support flange 26 resting thereon, as shown, to secure tip 50a of support 20 (and end 2a of media 2) above the bottom of the mold 40, as desired. Annular wall 53 provides for a centering, to properly position outer support 20 within the mold 40.

The media 2 also is preferably supported above engagement with structure in the mold 40, during molding, so that tip

2*a* of the media 2 does not project through the eventually formed end cap 10. In the particular example shown in FIG. 5, the media 2 is held in place above a bottom of the mold 40 by being secured to support 20. In particular, media 2 can be secured within end cap 9 FIG. 1, for example by being embedded therein, along with the support 20. When end cap 9 is formed before end cap 10, the media 2 is secured by end cap 9 from dropping to a bottom of mold 40. As a result, the media 2 is supported above the bottom of the mold 40 (and ridge 42) as long as the support flange 26 is supported on shelf 52 (and the media length is sufficiently short).

In the event that support 20 does not extend all the way to end cap 9, alternate arrangements can be used to keep the media 2 from bottoming out on a mold surface within mold 40. For example, a bead of adhesive or similar structure around the media 2, to engage the support 20 and inhibit the media 2 from dropping any further than as controlled by the support 20, could be used. Another example approach for this is by forming a pocket in the outer support, to support a liner that does extend all the way to the opposite end cap, as discussed below with respect to FIGS. 17-21.

In some instances, media standoffs can be positioned within mold 40 or on the outer support 20, if desired.

Referring to FIG. 5, it is noted that, for the preferred example shown, ridge 42 does not function as a mold or media standoff, for the media 2 or support 20. That is, when the media 2 is properly positioned within the mold 40, ridge 42 is spaced from the media 2 and support 20, typically a distance of at least 0.2 mm and usually at least 0.3 mm, for example 0.3-1.2 mm, inclusive.

The distance of spacing ridge 42 from the media 2 will define a deepest extension of the groove 35, in the cartridge 1, FIG. 1, from whichever adjacent side 10*a*, 10*b*, is closest to the media 2. The minimum depth of the groove 35 is typically at least 1.5 mm, usually at least 2.5 mm, often 3 mm or more, for example 3.5-7 mm, from a closest one of surfaces 10*x*, 10*y*. Usually, the closest surface will be the outer ring, 10*y*.

Still referring to FIG. 5, attention is directed to region 43 of mold cavity 41. In the final product, as discussed above, region 43 will define an outer radial seal surface 18*s* of outer radial seal portion 18, FIG. 1. For this reason, region 43 includes steps 55 in outer wall 56, although alternate seal shapes are possible.

The deepest portion of the groove 35 is typically located no more than 15 mm, and usually no more than 13 mm, often an amount within the range of 7-13 mm, from an outermost portion of radial seal surface 18*s*.

It is desirable to obtain appropriate uncured resin location and distribution within mold cavity 41, to obtain a desired, controlled, product. If uncured resin is not appropriately located, during its rise it can begin to dislodge the media 2 and/or support 20 (i.e., media pack 48) from a desired position in the mold 40. Further, if uncured resin is not appropriately located, quality control of the seal region 18, FIG. 1, can be an issue. Also, uncontrolled flash formation can be a problem.

Referring to FIG. 5, during a typical molding operation, non-risen, uncured, resin is first dispensed, (with spinning of the mold 40 around central axis 60), into outer region 43. The mold 40 is spun at a sufficient rate, to retain the uncured resin against steps 55 and wall 56, within region 43, and to inhibit flow over ridge 42 into region 44. The amount of spinning necessary to control the flow of resin is dependent upon the nature of the resin and the size of the mold.

For a mold of the example dimensions discussed for the example shown in FIG. 4, with a polyurethane that will rise about 100% in volume to form a material with a hardness, shore A, of 12-20, a spin rate of about 90-120 rpm (revolutions per minute) will be sufficient, although alternatives are possible.

Figure 6:
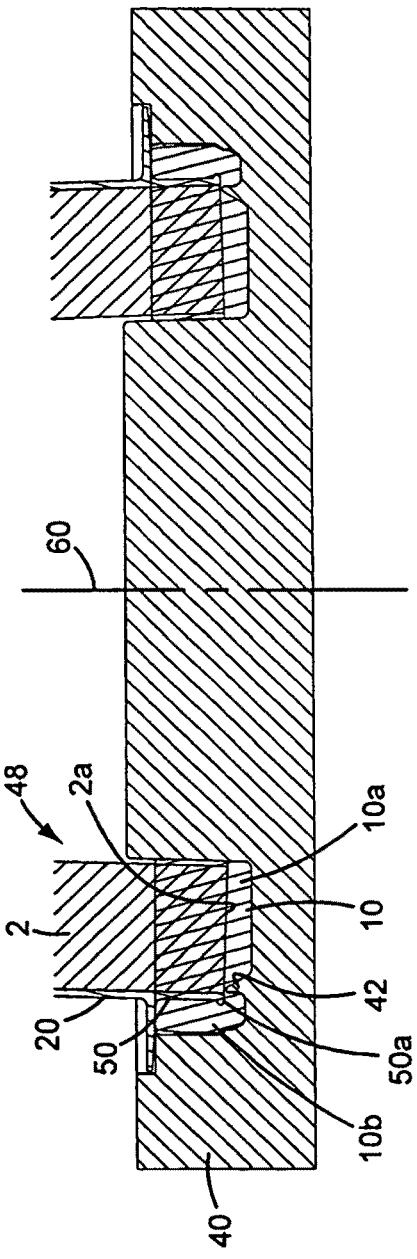
FIG. 6 is a schematic view corresponding to FIG. 4, but showing molded end cap and seal components, resulting from a step of allowing a resin placed within the mold to properly rise and cure.

After the resin has been dispensed into region 43 of the mold, the spinning of mold 40 is stopped, allowing the resin to settle and flow. A portion of the resin during the settling process, will flow over ridge 42 into region 44. The preformed media pack 48, comprising the media 2 and support 20, is then inserted into the mold 40, as shown in FIG. 5. In due course, the resin will rise and cure with: formation of the outside radial seal 18, FIG. 1; formation of the groove 35, FIG. 1; and, generation of end cap portions 10*a* and 10*b*, FIG. 1. The process will result in the media 2 and portion 50 of support 20, being immersed in, or embedded in, the final molded end cap 10. This is shown in FIG. 6, in which the molded end cap 10, still in the mold 40, is shown schematically.

The ridge 42 provides another advantage with respect to the molding operation. In particular, a volume taken up by the ridge 42, is a volume not occupied by resin before cure. As the resin cures and rises, it expands in all directions. Greater control of the curing process can be obtained, by having a resin void represented by the presence of ridge 42.

Also, opposite sides 42*i*, 42*o* of the ridge 42, FIG. 4 provide different effects. The radially inward side 42*i*, is slanted, and faces upwardly toward the media 2, FIG. 5, and radially inwardly. The acute angle of this slant, i.e., angle CG, FIG. 4, is at least 15°, typically within the range of 20°-40°, inclusive, often 25°-35°, inclusive, and usually not more than 50°, for example. As a result of this angle, resin above surface 42*i* will expand more toward the media 2 and aperture 11 and less toward region 43 where precise control of resin flow is needed to obtain a good seal definition. The term "acute angle" in the context of this paragraph, is meant to refer to angle CG as shown in FIG. 4 and the resulting angle in the molded groove 35. In the cartridge 1, it is the acute angle between the inside wall 35*i* of the groove, formed by surface 42*i* and a plane (or cylinder) parallel to axis 15, FIG. 1 (or axis 60, FIG. 6).

In general, the resulting groove 35 would have an inverted v-shaped cross-section. For the type of groove shown, the v is an asymmetric v, i.e., the side walls of the v extend at different angles with respect to central axis 60 (or 15, FIG. 1).

Typically, an inside angle of the groove 35, between the sides 35*i*, 35*0* (formed by surfaces 42*i* and 42*o* respectively, is at least 15°, usually within the range of 20°-40°, inclusive, typically 25°-35°, inclusive and usually not more than 50°. This would correspond to angle y shown on the mold in FIG. 4.

Surface 42*o*, the radially outer side of the ridge 42, is typically parallel or nearly parallel with central mold axis 60 and central axis 15, FIG. 1, of the media 2, i.e., the direction of axial longitudinal extension of the media 2 and region 50 of support 20. As a result, surface 42*o* operates as a wall, and does not cause undesirable angular direction to the expanding resin as it cures, again facilitating avoidance of undesirable interference with a desired, controlled, rising cure within mold region 43.

It is noted that discussion of the angle of extension for wall sections 42*i* and 42*o* (and resulting groove walls 35*i* and 35*o* respectively) is meant to refer to relatively straight (in cross section) central portions of these walls, and not to curved or radiused regions adjacent wall ends.

Referring to FIG. 4, it is noted that the mold 40 includes a radially inner projection 65 at an upper end of wall 56, which forms an undercut 66*u* in the mold at corner 66. If an appropriate amount of urethane is dispensed within the mold cavity 41, before insertion of the media 2 and support 20, the resin will rise to engage this undercut. The undercut 66*u* will leave an artifact in the urethane at this location that can be viewed by the operator during manufacture, when the cartridge is removed from mold 40 and is inspected for quality control. For example, if the resulting shaped urethane surface from the mold undercut is not present in the product, it can be easily and readily concluded that insufficient resin was included in the mold 40. Thus, the undercut 66*u* can be used to identify underfill situations.

In addition, the mold undercut helps inhibit undesirable mold flash from extending across surface 26*a*, FIG. 1, of projection 26.

In typical preferred manufacturing processes, the relationship between the ridge 42 and projection 50, FIG. 5, are used, to control resin flow during rise and cure. In the example shown for FIGS. 1-3, it is preferred that the portion of projection 50 that is embedded in the end cap 10, FIG. 1, during end cap molding, is a solid, substantially imperforate, construction. The term "substantially imperforate" in this context, is meant to indicate that projection 50 is generally impervious to flow therethrough of resin, during a resin rise and cure operation. The reason it is preferred that projection 50 be imperforate, at least in some instances, will be understood from the following.

Preferably, the projection 50 is positioned with tip 50*a* oriented to provide for a small flow space between the tip 50*a* and the ridge 42. The space is typically at least 0.2 mm but no greater than 1.5 mm, usually no greater than 1.2 mm, for example within the range of 0.3-1.2 mm, inclusive, typically 0.3-1.0 mm inclusive.

Typically the outside diameter of tip 50*a* is slightly larger than the diameter of the peak 42*a* of the ridge 42.

The close spacing between the tip 50*a* of projection 50, and the peak 42*a* of ridge 42, provides for a blocking or damming affect to flow of resin during rise and cure, between cavity section 43 and cavity section 44. This helps control resin rise and flow within cavity section 43, which forms the radial seal.

If the projection 50 is impervious to resin flow therethrough, the damming effect is facilitated. This will be preferred for cartridges 1 with an outside diameter of 9 inches (228.6 mm) or less. With larger arrangements, as discussed below in connection with FIG. 17-22, some perforations may be desirable, with alternate type structures. Indeed even with arrangements according to FIGS. 1-3, some perforation in region 50 can sometimes be allowed, without significant undesirable resin flow. It will be preferred that region 50 be completely impermeable, for arrangements according to FIGS. 1-3, and that the ring defined by tip 50*a* have a straight, even, planar, edge. However, modifications from this, that do not provide for an undesirable resin flow, are acceptable It is also preferred that tip 50*a* not engage ring 42, to avoid formation of leaks in the resulting end cap.

Referring to FIG. 4, it is noted that a bottom 43*x* of region 43 is not as deep, as a bottom 44*x* of mold region 44. Thus, the resulting outer end cap surfaces 10*x*, 10*x*, FIG. 1, of sections 10*b* and 10*a* respectively are not coplanar, rather surface 10*x* of region 10*a* is further away from end 5, than is a surface 10*y* of region 10*b*. For a typical arrangement this difference in distance will be at least 0.5 mm and usually 0.5-3.5 mm, inclusive. In the molding operation, mold features that provide for this difference, help ensure control over flow of resin from region 43 into region 44, after the spinning operation is stopped. With respect to the final product, it helps ensure that region 10*b* does not axially engage in any of the housing, in a fashion that could desirably interfere with the radial seal operation.

The ridge 42 is generally configured to provide a groove that is at least 0.5 mm deep, usually at least 1 mm deep, often at least 1.5 mm deep, typically at least 2.5 mm deep, and in many instances such as the examples herein at least 3.5 mm deep in minimal depth from a closest adjacent portion of each of surfaces 10*x*, 10*y*. The groove is typically not more than 11 mm deep, in the deepest extension from each one of surfaces 10*x*, 10*y*.

Choosing the amount of resin to dispense in region 43, at the initiation of the molding process, is a matter dependent upon the specifics of the resin, and the size of the end cap to be formed. Choosing the height of ridge 42, is in part a factor relating to the nature of the chosen resin material, and the size of the housing seal region 10*b* to be formed by cavity 43.

In FIG. 4, example dimensions are provided for mold and mold cavity usable to provide an end cap and in accord with the example of FIGS. 1 and 3. In FIG. 4 the indicated dimensions are as follows: CA=254 mm; CB=212 mm; CC=194.5 mm; CD=117.7 mm; CE=0.76 mm; CF=1.8°; CG=30°; CH=4 mm; CI=1.0 mm; CK=13.5 mm; CL=19.0 mm; CM=38 mm; CN=40 mm; CO=1.5 mm; CP=5.5 mm; CQ being a full radius (not specified); CR=176.8 mm; and CJ indicating the minimum seal height (dimension not given but calculable from proportion).

Of course the dimensions can be varied for different sizes of end caps. Typically those dimensions that would be varied would be the outer and inner diameter dimensions, and not the various height dimensions and angles. That is, the seal region would typically maintain its definition, although the diameter of the seal would be varied.

IV. Air Cleaner Assembly Issues and Feature Issues Relating to the Presence of Groove 35 in U.S. Ser. No. 11/415,528.

As previously explained, the housing seal 18, FIG. 1, separates filtered air and unfiltered air regions, within an air cleaner during use.

Figure 7A:
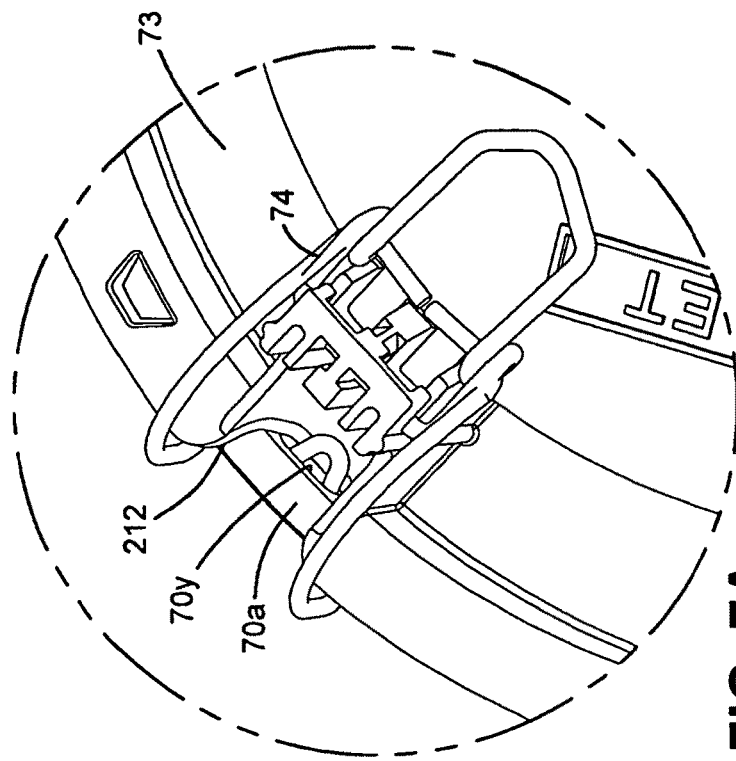
FIG. 7A is an enlarged fragmentary view of a portion of FIG. 7.
Figure 7:
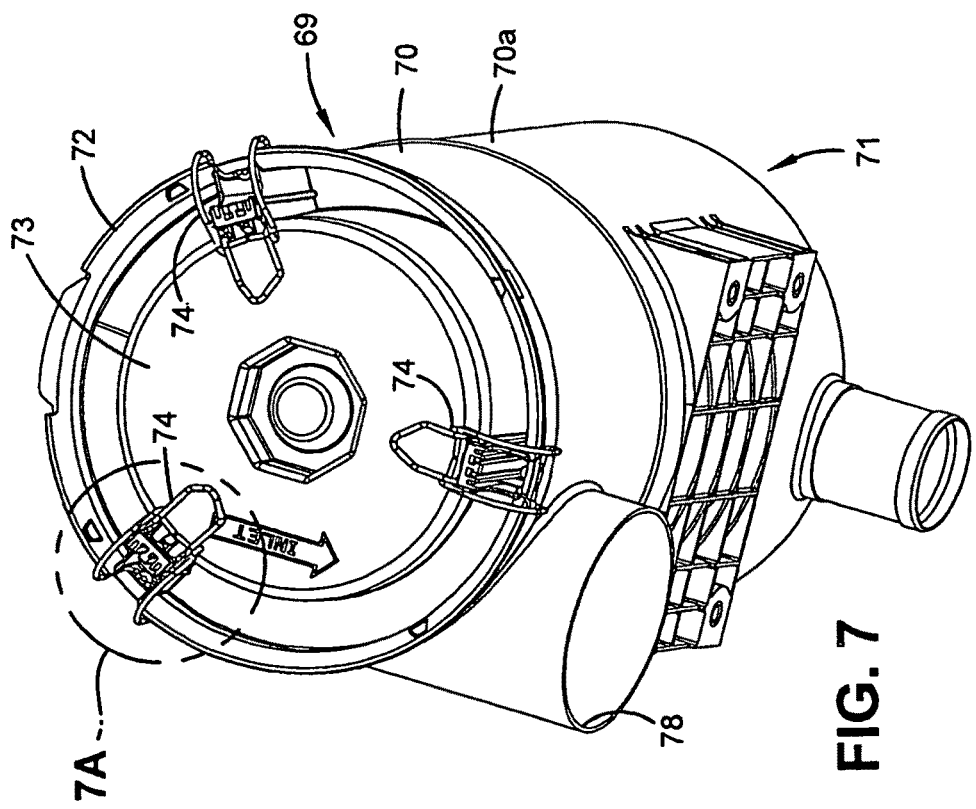
FIG. 7 is a bottom perspective view of an air cleaner housing useable in an air filter cartridge having features resulting from the manufacturing process of FIGS. 4-6.

Attention is now directed to FIG. 7, in which an air cleaner 69, including a housing 70 is depicted. The housing 70 is sized and configured to receive cartridge 1 therein during use. Referring to FIG. 7, housing 70 includes opposite ends 71, 72. End 72 is generally an openable end, closable by an end service or access 73 cover. As a result end 72 is a service access, by which a cartridge 1, FIG. 1, can be inserted into and be removed from an interior of housing 70, during operation. Examples of housings for which such features are described for example in U.S. Provisional Application 60/699,136 filed Jul. 13, 2005; U.S. application Ser. No. 11/210,914 filed Aug. 24, 2005; U.S. Provisional Application Ser. No. 60/604,554 filed Aug. 25, 2004; U.S. Provisional Application Ser. No. 60/677,031, filed May 3, 2005; U.S. Publication 2004/0134171 A1, published Jul. 15, 2004; and PCT Publication WO 04/039476, published May 13, 2004. These references, again, being incorporated herein by reference.

In FIG. 7, housing 70 is depicted in a bottom perspective view, i.e., from a direction normally underneath the air cleaner 69 when installed. The housing 70 comprises a housing body 70*a* (typically molded plastic) having an opening at end 72, closed by removable access cover 73 (also typically molded plastic). Typically access cover 73 is secured in place by latches 74. Internally, access 73 would typically have a precleaner shield and ramp thereon, discussed below, to facilitate preseparation of dust within air cleaner 69.

Precleaner features in such end covers are described and shown in the references incorporated two paragraphs previously, and are discussed below in connection with FIG. 16.

Figure 8:
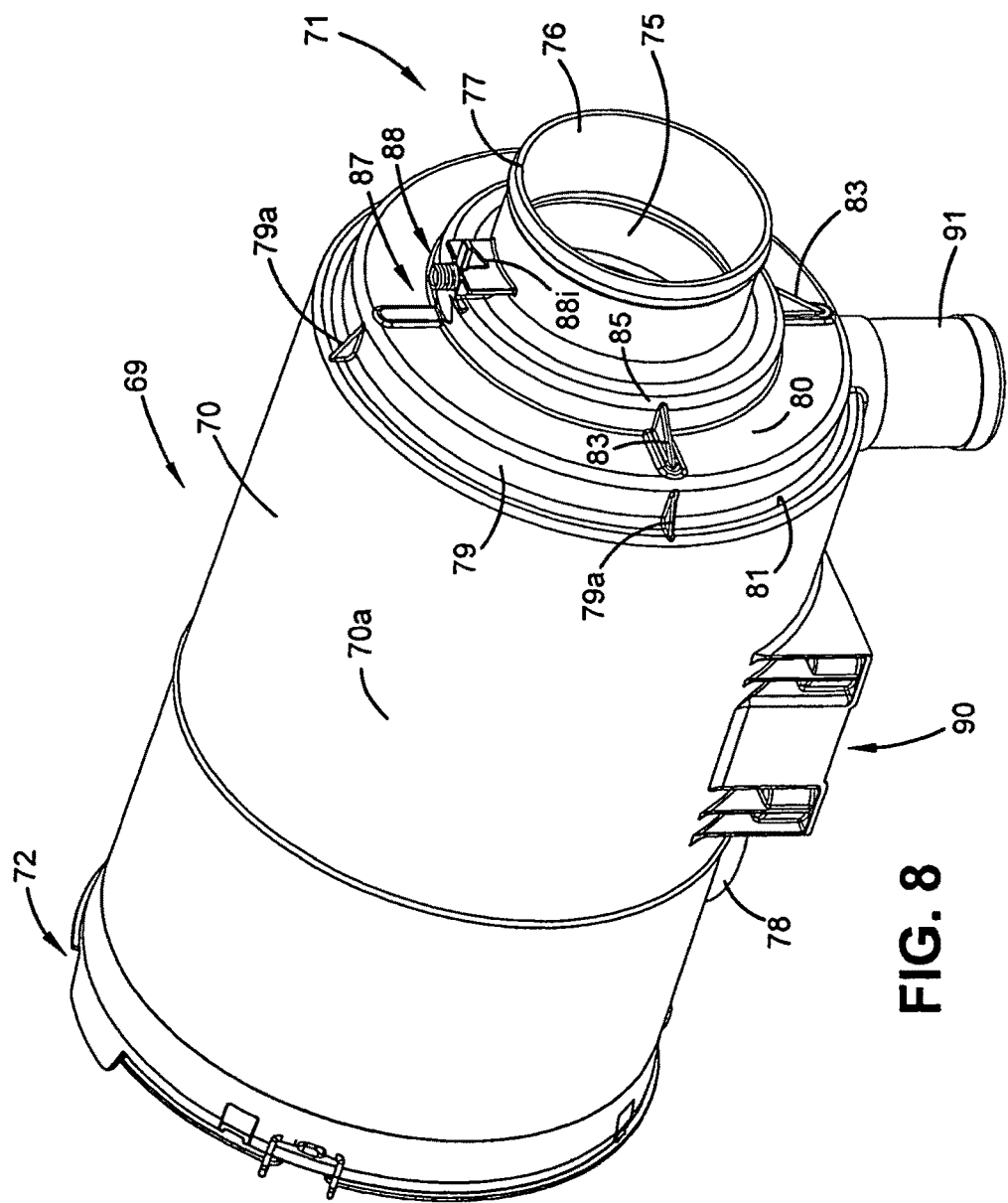
FIG. 8 is an outlet end perspective view of the housing body of FIG. 7.

In FIG. 8, an upper perspective view of a portion of air cleaner 69 and housing 70 is provided. End 71 includes an air flow aperture 75 therein. In general, air flows through aperture 75, during operation of the air cleaner 69.

As mentioned above, the serviceable filter cartridge can be constructed, configured and applied for use with either a "out-to-in" or "in-to-out" flow pattern during filtering. The particular cartridge 1, FIG. 1, depicted, is particularly well suited for out-to-in flow, during filtering. However, the principles and techniques described herein, can be applied in alternate arrangements, i.e., "in-to-out" flow arrangements.

Referring to FIG. 8, since the housing 70 utilizes an "out-to-in" filtering flow through the cartridge, during operation aperture 75 will generally be flow outlet 76. Flow outlet 76 is generally defined by collar 77 to which an air flow conduit such as a flexible hose can be secured, when the housing 70 is configured for operation. In FIG. 8, an air flow inlet 78 in housing 70 is partially viewable, see also FIG. 7.

Referring again to FIG. 8, in which the exterior of the housing 70 is viewable, adjacent to end 71, housing region 79 defines (inside of the housing body 70a) an interior, annular, seal surface against which the outside radial seal 18, in particular surface 18s, of cartridge 1 is sealed during installation. Region 80, on the other hand, defines (inside of housing body 70a) an inner end wall overlapped by portion 10a of end cap 10 of FIG. 1, when cartridge 11 is installed in housing 70.

It is important that wall 79, 80 maintain defined structures and shapes during storage, installation, assembly and use. If it distorts sufficiently from specification, the ability to properly install and remove the filter cartridge 1 can be affected.

For example, when housing body section 70a is a molded plastic component, (for example a molded plastic such as a glass filled polypropylene) maintaining the integrity of interior surfaces defined by regions 79 and 80 can be an issue. To facilitate this, portions 79 and 80 of the housing 70 are provided with structural features that provide rigidity at those locations.

Certain of these features are located on an interior of region 80. These are discussed below and are viewable in FIG. 10, a view directed into housing section 70a from open end 72. Other features are on an exterior and are viewable by reference to FIG. 8.

Attention is first directed to the features viewable in FIG. 8. Referring to FIG. 8, buttress or gusset supports 79a are positioned around an outside of region 79, operating as an exterior support between region 79 and region 81. Two such gusset supports 80 are viewable in FIG. 8.

Supports 79a operate to buttress region 79. This will help ensure that an inside surface to region 79 does not become distorted during manufacture, installation and use. A result is strengthening of the inside surface to region 79, which is a surface against which the radial seal for the main filter cartridge 1 is formed, against undesired levels of distortion.

The specific number of supports 79a on the outside of region 79, can be varied. Typically what is needed is enough supports to provide adequate strengthening for region 79, usually 2-6 supports will be adequate.

Still referring to FIG. 8, attention is now directed to buttress or gusset supports 83. Supports 83 provide engagement between surface region 80 and a portion of 85 of axially projecting collar 77. Buttress or gusset supports 83 help stabilize interior surface portion of region 80, against distortion from its designed shape, during manufacture installation and use. This will help ensure that an interior region of housing section 70a, which is engaged by the filter cartridge 1 during use, does not undesirably distort in a manner that would inhibit convenient and proper installation and removal of cartridge 1.

It is noted that for the particular example shown in FIG. 8, there are three supports 83 (two visible), not evenly radially spaced around collar 77. A variety of alternatives are possible. What is desired is an adequate number of supports to facilitate stability to region 80.

It is specifically noted that there is no gusset support located at region 87. Such a support could be useful, but would interfere with other structure. At this location, in FIG. 8, a structure associated with tap 88 for restriction indicator equipment or similar equipment is positioned. The tap 88 is shown with a strengthening gusset 88i.

Still referring to FIG. 8, other exterior features in housing 70 not previously discussed include base 90, for mounting the housing 70 to equipment such as a vehicle; and, dust drop tube 91. The dust drop tube 91 typically is used with an evacuator valve positioned there over, for periodic ejection of dust removed within interior of housing 70, by a pre-cleaner arrangement. Such a pre-cleaner arrangement dust drop to combination or discussed, for example, in U.S. Publication 2004/0134171 A1, published Jul. 15, 2004; PCT Publication WO 04/039476, published May 13, 2004; and U.S. Provisional Application 60/677,031, filed May 3, 2005, each of which is incorporated herein by reference.

Figure 10:
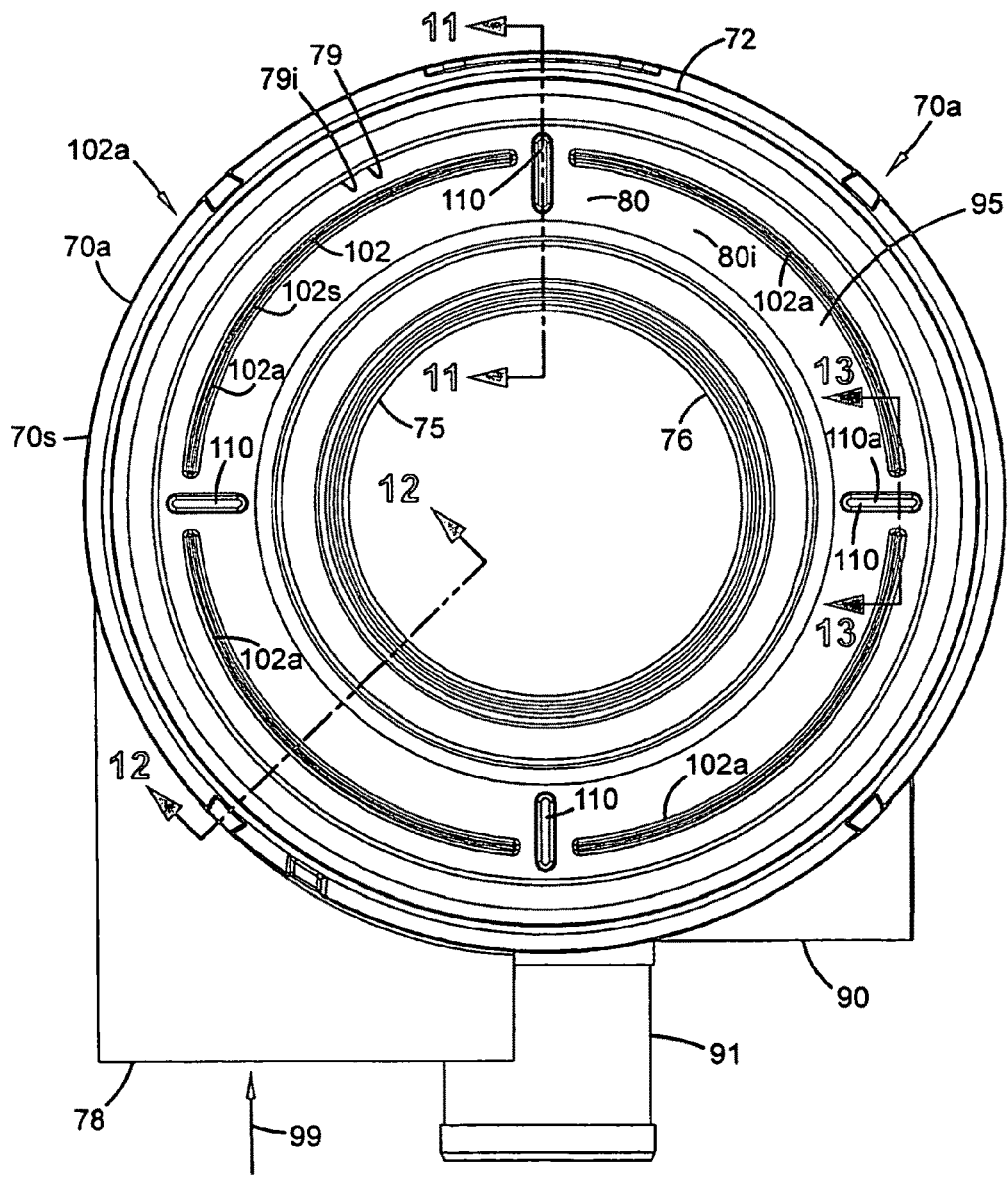
FIG. 10 is a schematic end view of the housing body of FIG. 8 with the serviceable filter cartridge removed; the view being through an open end, as a result of removal of an access cover, and showing internal detail.

Attention is now directed to FIG. 10. In FIG. 10, an end view toward open end 72 of housing section 70a is provided. Thus, interior 95 of the housing 70 is viewed.

Referring to FIG. 10, inlet tube 78 in housing 70 is shown. The inlet tube 90 shown is a side inlet, in particular a tangential inlet. Air will enter through a side 70s of housing body 70a in the general direction of arrow 99, and, as a result of the tangential entry, will initially be directed into a cyclonic or circular pattern. For the example shown in FIG. 10, the circular pattern would be clockwise from the viewpoint of FIG. 10, however alternative inlet locations for alternate inlets are possible, an example end inlet being discussed below in connection with FIG. 21. As discussed previously, the inlet 78 would typically be used in conjunction with a cover member having a shield and cyclonic ramp thereon, to facilitate the cyclonic motion to the air, and pre-separation of contaminant within the air.

Referring to FIG. 10, interior surface 80i of region 80, FIG. 8 is viewable, as well as interior region 79i of surface 79, FIG. 8.

As discussed previously, it is desired to provide rigidity to surface 80i, to facilitate installation and removal of a service cartridge 1, through the life of the air cleaner 69. Some rigidity was provided by buttress arrangements 83, FIG. 8. Additional strength and rigidity is also provided by selected surface features on interior surface 80i.

In particular, and still referring to FIG. 10, attention is directed to ring 102. Ring 102 is a segmented ring 102s comprising individual spaced, segments 102a. The specific number of segments 102a is not critical, however for the example shown there are four such segments. Typically there will be 2-6 segments to a segmented ring 102. (The ring 102 could be continuous instead of segmented, in some applications.)

The ring 102 is positioned on an inside portion 80i of wall 80. It is radially spaced from both the outlet 76 and annular wall 79 which forms the seal surface.

Ring 102 is constructed as a projection toward the viewer in FIG. 10. Typically it is molded integral with housing base 70a. The presence of such ring 102 on surface 80, will add strength and rigidity to the surface 80, inhibiting distortion. The ring 102 generally projects inwardly from wall surface 80i, usually at least 1 mm, typically at least 1.5 mm, usually not more than 12 mm and often an amount within the range of 1.5-8 mm, inclusive.

Figure 11:
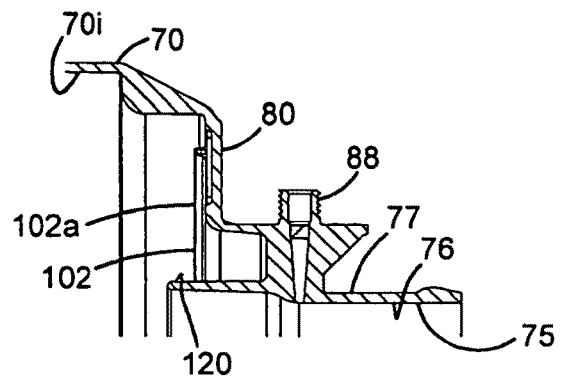
FIG. 11 is an enlarged, fragmentary, cross-sectional view taken along line 11-11, FIG. 10.
Figure 12:
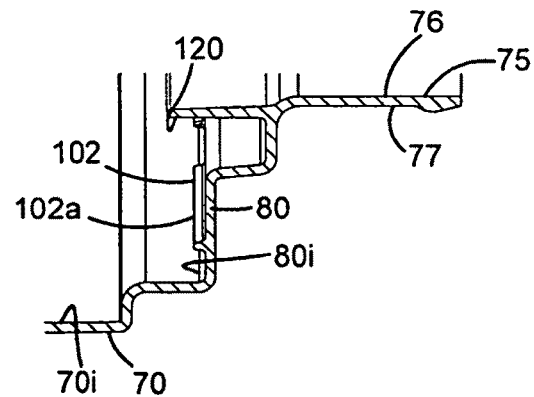
FIG. 12 is an enlarged fragmentary view taken along line 12-12, FIG. 10.

Attention is directed to FIG. 11, taken as a fragmentary cross-section along line 11-11, FIG. 10. In FIG. 11 a portion of ring 102, in particular one of the segments 102a, is viewable. In FIG. 12, an enlarged fragmentary view of the portion of FIG. 10 is also viewable, and a cross-sectional view of part of ring 102 is viewable.

Figure 13:
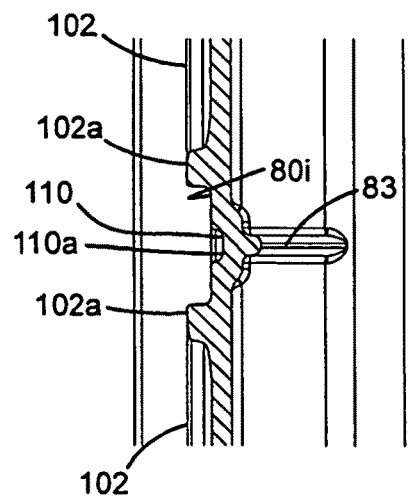
FIG. 13 is an enlarged fragmentary cross-sectional view taken along line 13-13, FIG. 10.

Attention is now directed to FIG. 13, which is an enlarged fragmentary cross-sectional view taken along line 13-13 FIG. 10. In FIG. 13 a portion of a segment 102a of ring 102 is also viewable. Also viewable in FIG. 13, is a portion of depression 110. Referring to FIG. 10, for the example shown there are a plurality of depressions 110 positioned in surface 80i, in this instance each depression 110 being positioned between a pair of segments 102a. In FIG. 13 an enlarged view of one of the depressions 110, in this instance depression 110a FIG. 10, is shown.

Depressions 110 provide a variety of additional effects. For example, the depressions 110 help inhibit unintended sealing against surface 80i, through mistaken use of an inappropriate filter cartridge for assembly 69. Also, on the reverse side of selected ones of depressions 110, are positioned buttress supports 83, FIG. 8.

Referring to FIGS. 11 and 12, it is noted that for the particular air cleaner 69 depicted, the housing body 70a includes an inwardly projecting tube portion 120 that surrounds flow outlet 76. By "inwardly directed" in this context, it is meant that tube 120 projects toward interior 70i of housing 70, from air flow outlet 75.

Tube 120 can be used for a variety of purposes. It can be used to provide added strength to the structure of housing 70. In addition, it can be used to help guide filter cartridge 1 into position within housing 70. Also, it can be used as a sealing surface for a secondary or safety cartridge, if used. This latter will be understood by reference to FIG. 9.

Figure 9:
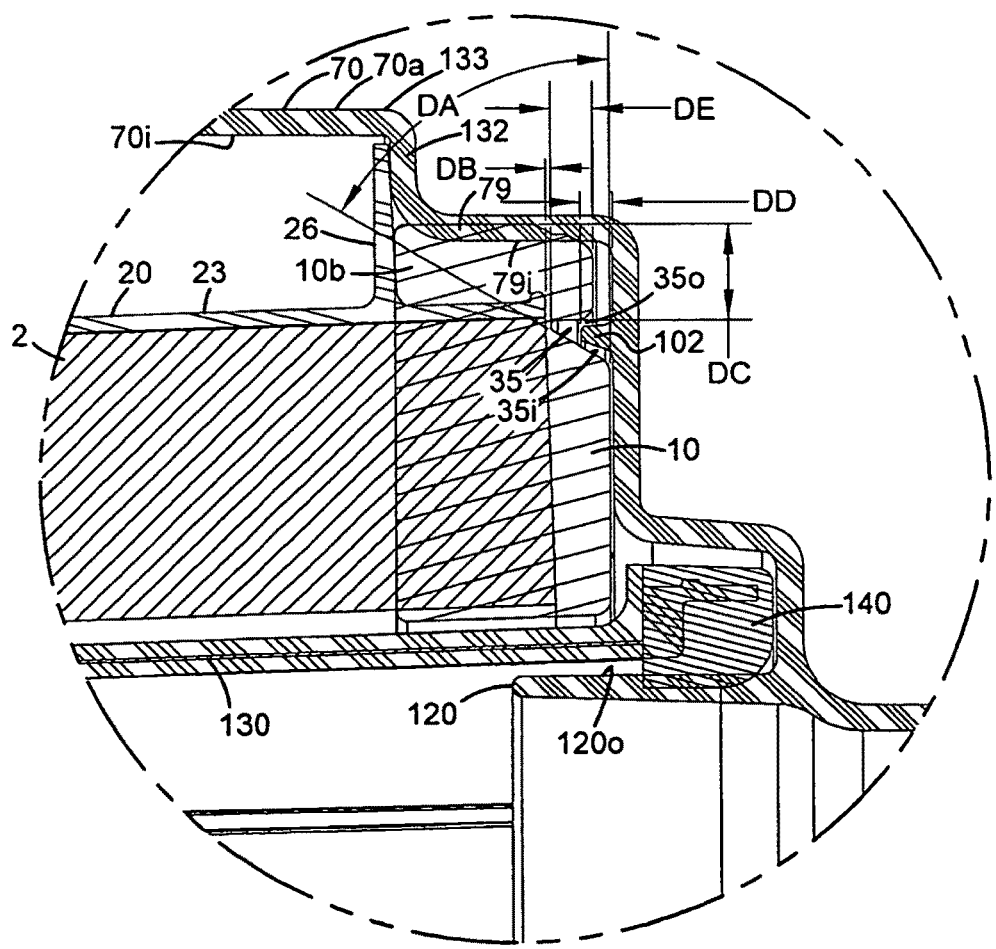
FIG. 9 is an enlarged fragmentary cross-sectional view of a portion of the air cleaner of FIGS. 7 and 8, depicted with portions of a main filter element and safety element positioned therein.

Attention is now directed to FIG. 9. FIG. 9 is an enlarged fragmentary view of a cross-section of a housing 70 including cartridge 1 positioned therein. Also positioned within an interior 70i of housing 70, is safety cartridge 130.

Referring to FIG. 9, housing body 70a includes radial flange 132, positioned between sidewall section 133 and region 79. Radial flange 132 provides an inside surface against which projection 26 on cartridge 1 will abut, during installation. This will properly position flange 26 relative to dust drop tube 91, FIG. 8, to primarily direct dust to drop tube 91, and primarily not into regions adjacent to surface 79i. This operation of flange 26 is described in U.S. Provisional Application 60/677,031, filed May 3, 2005, incorporated herein by reference.

Still referring to FIG. 9, end cap 10 is viewable with region 10b forming a radial seal with surface 79i. Also viewable is groove 35 overlapping segmented ring 102. The ring 102, then, is positioned to project at least partially into groove 35, helping ensure proper centering and positioning of cartridge 1 within the housing 70. The amount of projection into (or along) at least one side of groove 35 by ring 102 (i.e., into the groove 35) is at least 0.2 mm, typically at least 0.5 mm, usually at least 1-5 mm, and typically not more than 8 mm. (The depth of extension in this instance referring to extent of projection in, from a closest surrounding, axial surface 10x of end cap 10.)

Still referring to FIG. 9, secondary or safety element 130 is shown with end cap 140 positioned for radial seal engagement with outer surface 120o of projection 120. In FIG. 9 an amount of compression of end cap 140 and providing the radial seal, is shown by the amount of overlap between the drawing of undistorted end cap 140 and projection 120. The amount of compression of end cap 10 is shown by overlap between end cap region 10b and housing region 79.

In FIG. 9, example dimensions are indicated as follows: DA=60°; DB=0.5 mm; DC=9.2 mm; DD=3.0 mm; DE=4.0 mm.

V. Access Cover Features, FIGS. 14 and 15 of U.S. Ser. No. 11/415,528

Figure 14:
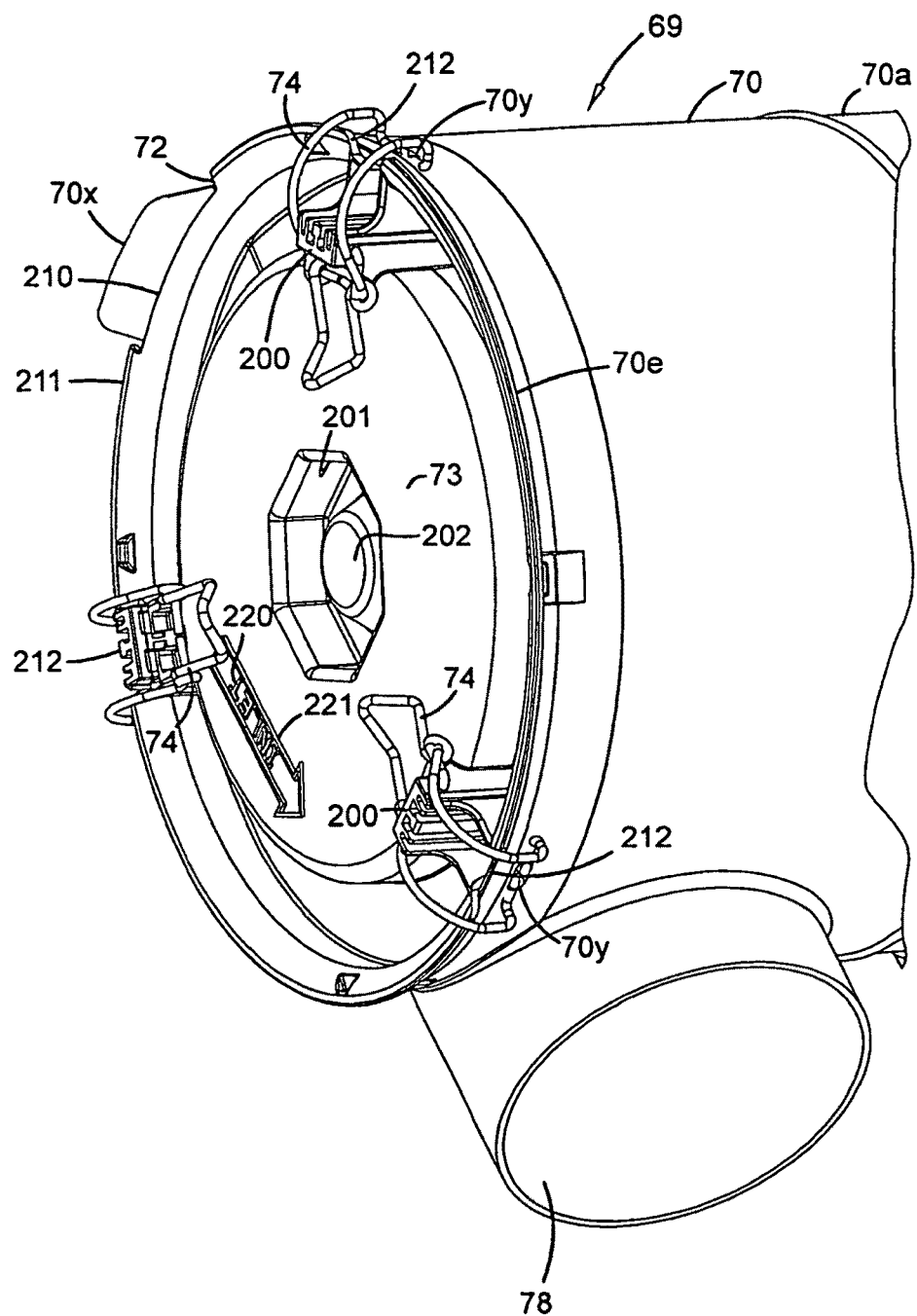
FIG. 14 is an enlarged fragmentary view of end portion and access cover of the air cleaner depicted in FIG. 7.
Figure 15:
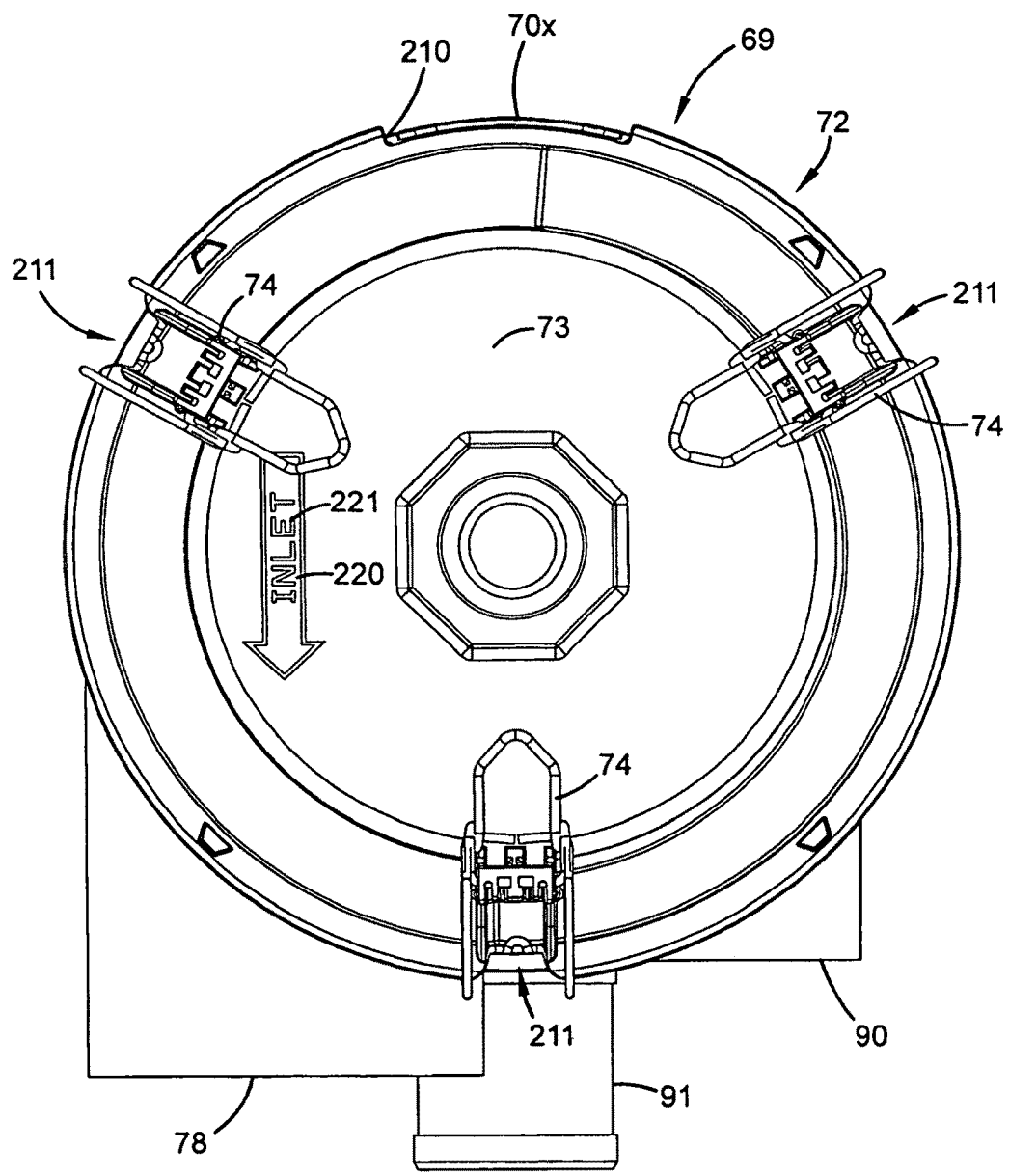
FIG. 15 is an end view of the housing depicted in FIG. 7.

Example access cover exterior features and access cover features for engagement with housing body are shown in FIGS. 14 and 15. In FIG. 14, a fragmentary side perspective view of a portion of air cleaner 69, in particular a portion adjacent end 72 is provided. In FIG. 14, the view direction is a bottom vective view. In FIG. 15 an end plan view toward end 72 of housing body 70a, i.e., air cleaner 69 is provided. Referring first to FIG. 14, the latches 74 are each mounted on an associated latch mount 200. For the example shown, the latch mounts 200 are radially spaced on access cover 73. The access cover 73 includes a central inward (axially) projection 201 with a central conically shaped reverse axial (outward) projection 202 therein. These provide for selected, preferred, engagement with end cap 9 of cartridge 1 discussed in connection with the variation of FIG. 16. (The access over 73 would typically be molded from plastic, with latches 74 then attached.)

Housing body 70a includes an end 70e defining an access opening, and on which cover 73 is mounted in closing relationship, during assembly. The end 70e is depicted with a tongue 70x projecting axially outwardly therefrom, and in a direction toward and past end cover 73. The tongue 70x projects through a gap 210 in outer radial lip 211 of access cover 73. Gap 210 and tongue 70x provide for radial indexing, to help insure proper rotational positioning of access cover 73 on body 70a, during assembly of housing 70. Additional indexing structure can be provided, if desired.

Each latch 74 extends through an associated gap 212 in rim 211, during mounting engagement. In FIG. 7a, it is shown that the latch then extends through an aperture 70y in body 70a, for the latch 74 to secure the access cover 73 to the body 70a. The gap 212 helps ensure that the latch 74 is not inadvertently engaged only with the access cover 73, during installation.

Referring to FIGS. 14 and 15, the end cover 73 can be provided with indicia or symbols 220 thereon to facilitate installation. In this instance the example symbols 220 include an arrow 221 which shows proper rotational mounting orientation of access cover 73 relative to the inlet 78.

A slight inward chamfer or scope in the housing wall of region 220 facilitates avoidance of improper mounting of cover 73, since the latch 74 will slide off if it does not engage one of the apertures 70y.

VI. Selected Internal Features, FIG. 16 of U.S. Ser. No. 11/415,528

Figure 16:
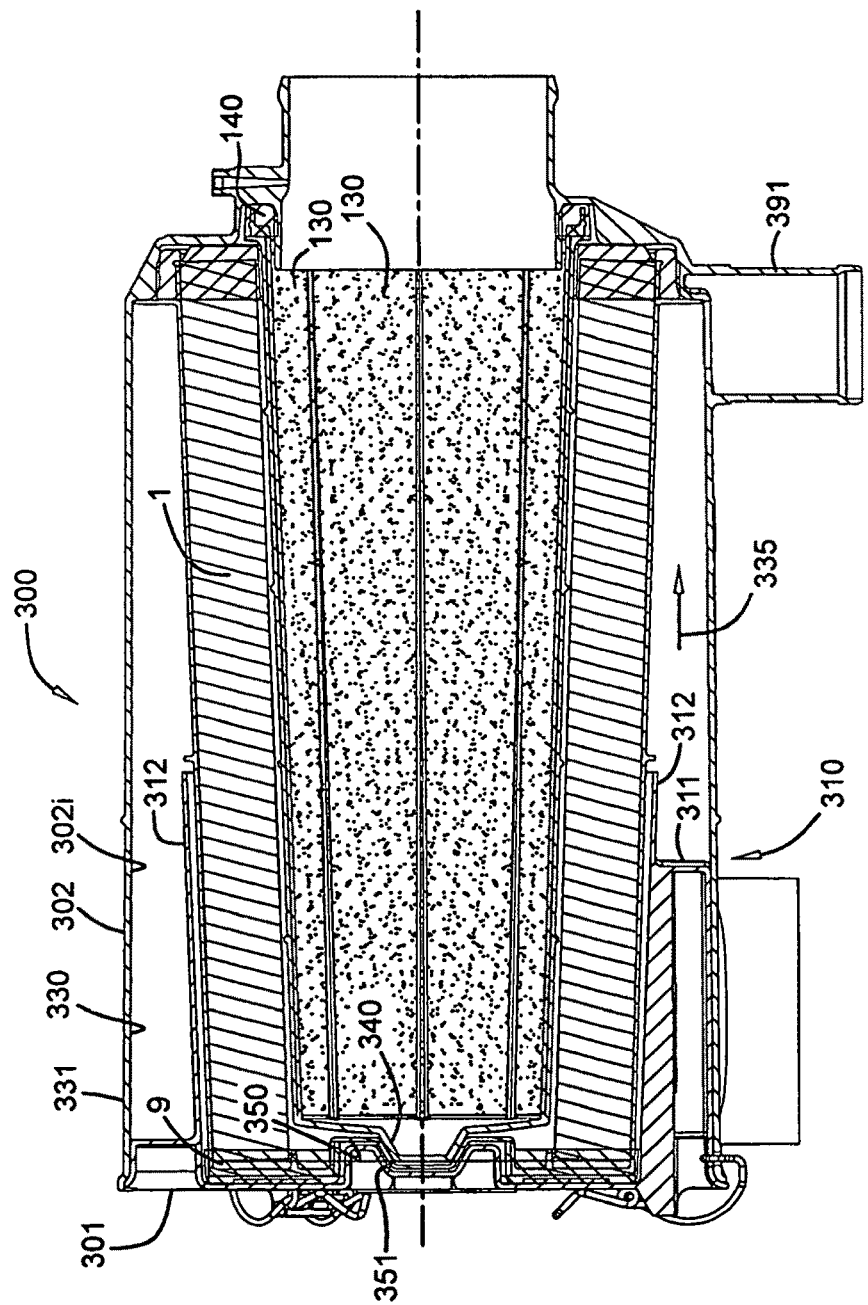
FIG. 16 is an enlarged cross-sectional view of an alternate air cleaner having many internal features analogous to those for the air cleaner of FIG. 7.

Referring to FIG. 16, at 300 an air cleaner is depicted, which includes many of the features of air cleaner 69 and cartridge 1. The example air cleaner 300, however, includes detailed variations in the access cover 301 and body 302 interface, from those shown in FIGS. 14 and 15. The particular housing example shown in FIGS. 16 and 300, is also shown in U.S. application Ser. No. 11/210,914 filed Aug. 24, 2005, and at FIGS. 39 and 39A, the complete disclosure of Ser. No. 11/210,914 being incorporated herein by reference.

FIG. 16 depicts a precleaner arrangement positioned on the access cover 301. A similar precleaner arrangement can be used for access cover 73, FIGS. 14 and 15.

Referring to FIG. 16, the precleaner arrangement is depicted at 310 and comprises ramp 311 and shield 312. Air entering the housing interior 302i, is directed into annular space 330 between the housing wall 331 and the shield 312, in a cyclonic pattern. The ramp 311 is typically a spiral ramp, and helps direct the air and dust, while spiraling, in the direction of arrow 335. The spiral motion, will spin dust toward the outer wall 330 and the dust will migrate in the direction of arrow 335 to dust drop tube 391.

Features drawn analogously in FIG. 16 to those in previously discussed, provide analogous operation. It is noted that in FIG. 16, cartridge 1 is positioned within interior 302i, as well as a safety cartridge 130. The main cartridge 1 is shown with a closed end cap 9 having central depression 350 therein, for receiving an inwardly directed projection on access cover 301. The cartridge 1 includes an axially outwardly directed central cone 351, for projecting into an outwardly projecting central cone on the access cover 301. Those features are shown for an axially outwardly directed FIG. 3, and thus a similar engagement with access cover 73, FIGS. 14 and 15, would be possible.

In addition, safety cartridge 130 is shown with a projection 340 thereon, at an end opposite seal arrangement 140. The projection 340 is sized and positioned to extend into projection 351 on end cap 9 of cartridge 1.

VII. An Alternate Example, FIGS. 17-22 of U.S. Ser. No. 11/415,528

Figure 17:
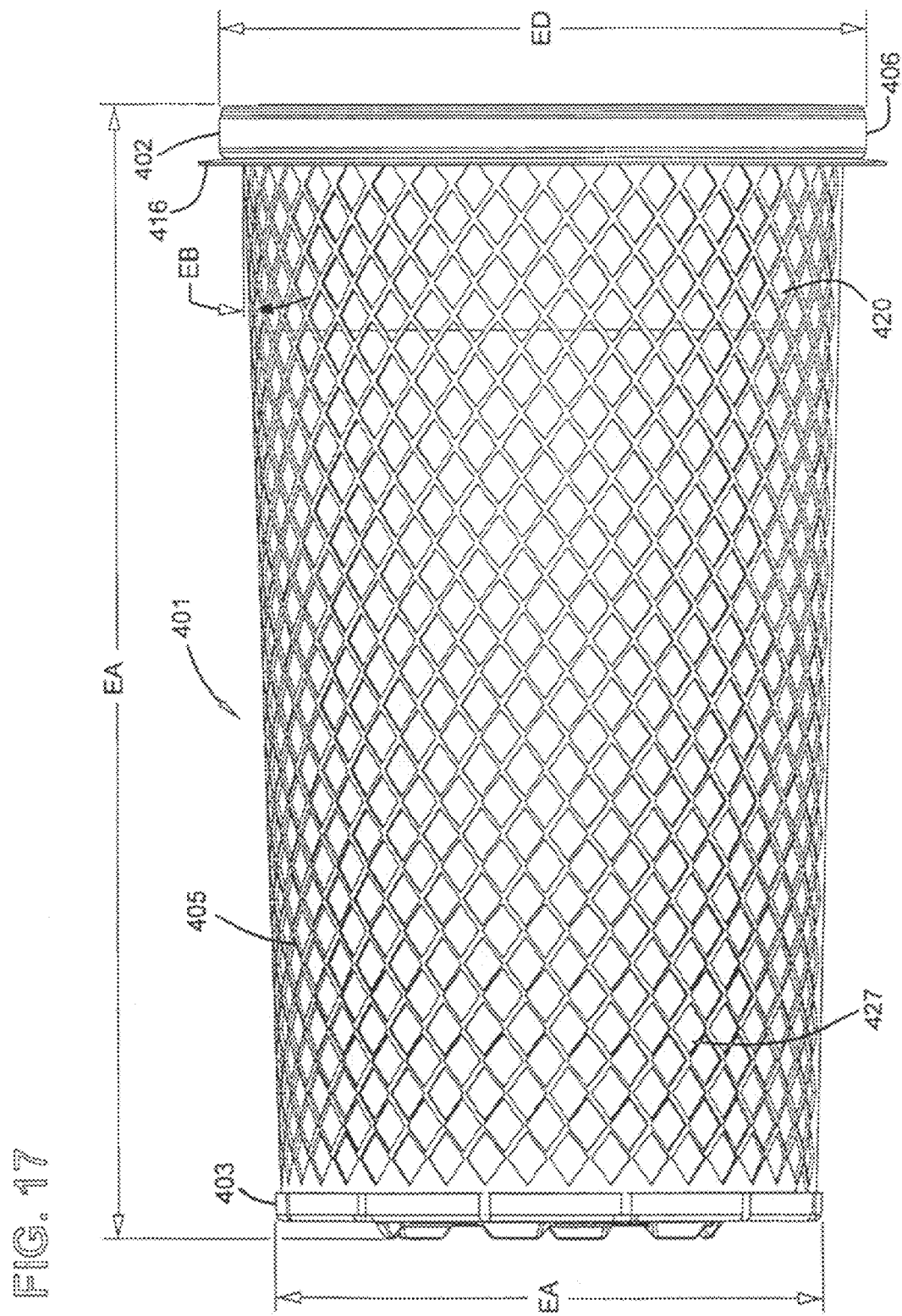
FIG. 17 is an enlarged schematic side elevational view of an alternate air filter cartridge useable in an air cleaner according to the disclosure of U.S. Ser. No. 11/415,528.
Figure 18:
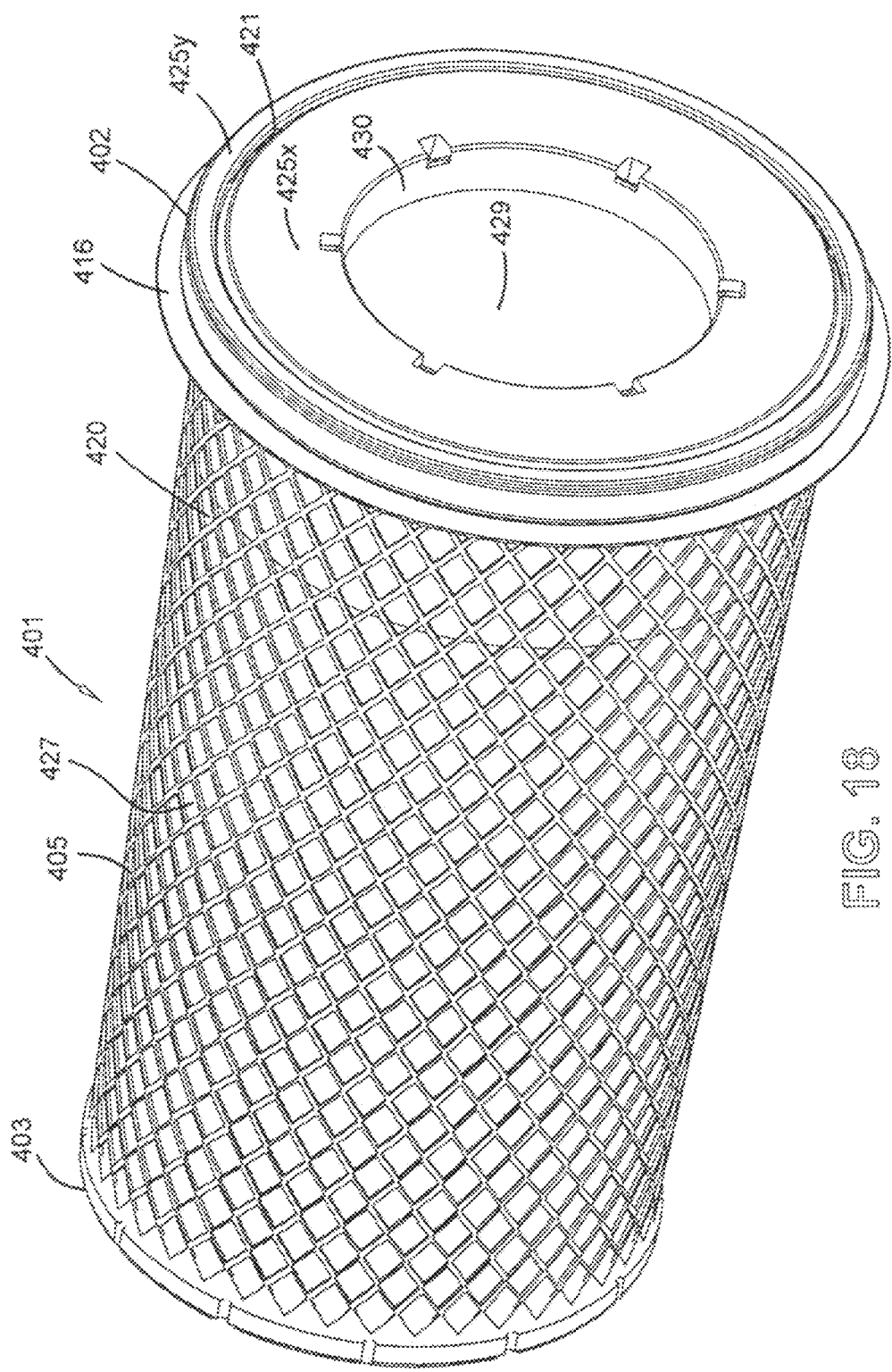
FIG. 18 is an enlarged outlet end perspective view of the cartridge depicted in FIG. 17.
Figure 19:
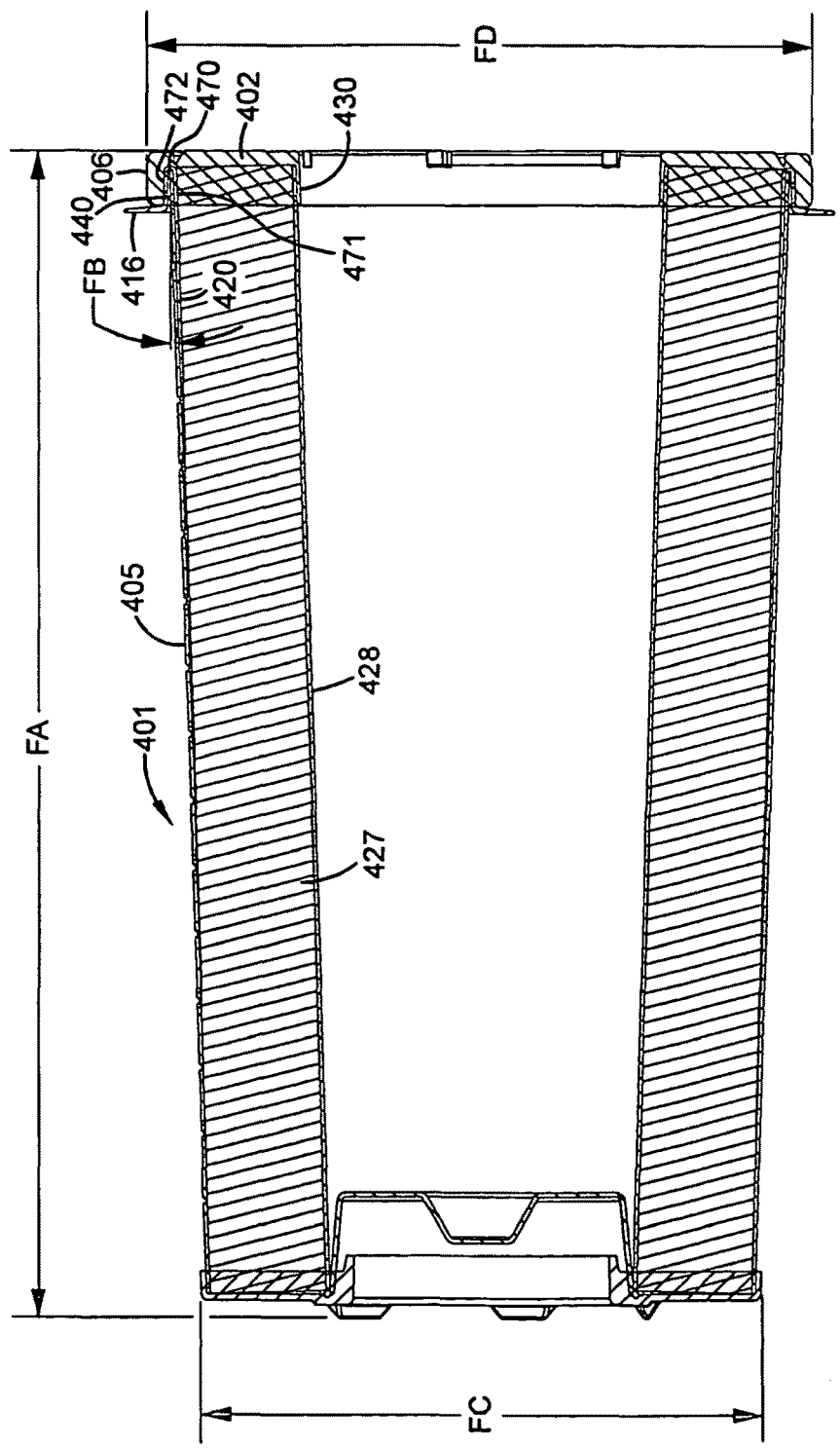
FIG. 19 is a cross-sectional view of the filter cartridge depicted in FIGS. 17 and 18.

In FIGS. 17-22 an alternate example for the main filter cartridge, and for interaction between the main filter cartridge and the housing, are shown. In FIGS. 17-19, an example main filter cartridge is depicted. Dimensions are as follows: EA=523.4 mm; EB=1.8°; EC=244.8 mm; ED=290.9 mm; FA=523.4 mm; FC=244.8 mm; FD=290.9 mm; and FB=1.8°. Thus, it will be understood that the features of FIGS. 17-20, are for an arrangement that utilizes a somewhat larger filter cartridge, than the example (with respect to described dimensions) discussed above for FIGS. 1-3.

Referring to FIG. 17, cartridge 401 is depicted having an open end cap 402 and an opposite closed, end cap 403. In the example cartridge 401 includes an expanded metal outer liner 405 extending from end cap 403 toward end cap 402. End cap 402 includes an outer region 406 configured as a housing outside radial seal to form a radial seal with an engaged portion of a housing, in use. The cartridge 401 further includes projection 416, analogous to dust shield 26. Underneath liner 405 is provided a shield 420, that extends from a region adjacent end cap 402 toward end cap 403. The shield 420 generally extends at least 10% the axial length of the cartridge, and not more than 40%, typically not more than 30%. The particular example cartridge 401 depicted, has a conical shape, decreasing in outside diameter from shield 416 toward end 403. Both the liner 405 and the media would correspond to this conical shape. The conical angle, EB, is typically 0.5-5°, usually 1.5-3°. The portion 420 of shield projecting outwardly from the end cap 402 is typically imperforate.

Referring to FIG. 18, end cap 402 is an open end cap having open central aperture 430. The end cap 402 also includes a groove 421 therein, separating the end cap into sections 425y and 425x. Groove 421 can be formed analogously to the groove discussed above, in connection with FIGS. 4-6.

Referring to FIG. 19, the media would be located at 427 and would typically comprise pleated media, for conical definition. However, a variety of alternate media can be used. It is noted that the cartridge 401 can be provided with an inner liner at 428, for example, perforated liner or expanded metal liner.

Referring to FIG. 19, it is seen that shield 420 and projection 416 are integral with one another, with tip portion 470 of the shield 420 forming a ring groove or receiving pocket 440, embedded in end cap 402. The ring groove 440 is formed between inner and outer wall portions 471, 472, to receive outer liner 405 projecting therein and to provide backup to the radial seal region 406.

Figure 21:
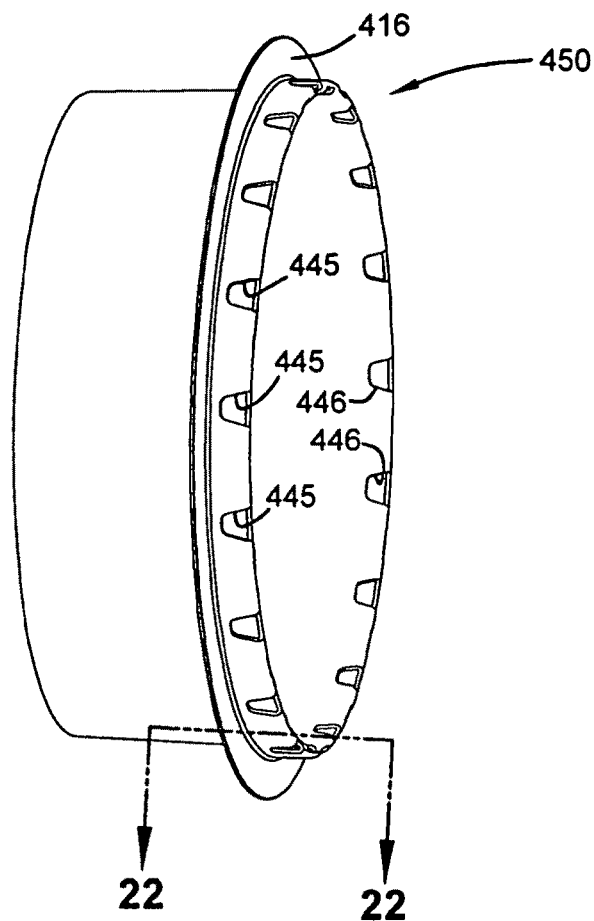
FIG. 21 is a schematic perspective view of a component useable in the cartridge of FIG. 17-19.

Attention is now directed to FIG. 21. In FIG. 21, support 450 is viewable. The support 450 includes shield 420 and projection 416, formed integrally with one another, as a preform. In use, shield 420 would be positioned between the media and an outer liner such as an expanded metal liner, as shown in FIG. 17. On the other hand, dust shield 416 will project radially outwardly around, and outside of, a portion of the expanded metal liner 405, FIG. 17.

Figure 22:
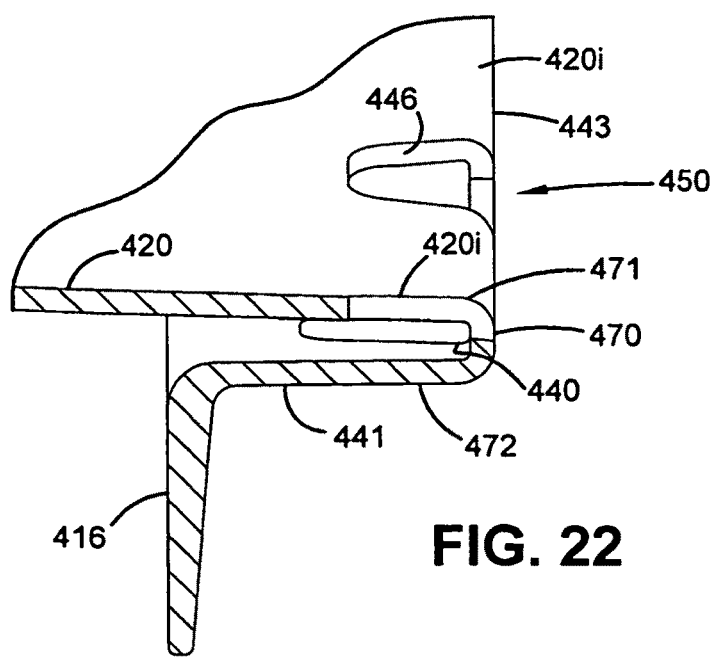
FIG. 22 is an enlarged fragmentary cross-sectional view of a portion of the component depicted in FIG. 21.

Attention is now directed to FIG. 22, an enlarged fragmentary cross-sectional view taken along line 22-22, FIG. 21. FIG. 22 shows the dust shield section 416 and shield 420 integrally connected to one another, through u-shaped groove forming receiving pocket 440. The pocket 440 has opposite inner and outer sides then, the inner side being an extension 420i of shield 420 and the outer side being formed by axial extension 441, with flange 416 thereon. Groove or pocket 440 is positioned between regions 420i and 441.

Referring to FIG. 21, is it noted that section 441 includes apertures 445 therein, radially spaced around support member 450. Further, region 420i, of shield 420, adjacent tip 443 includes apertures 446 therein. The apertures 445, 446, allow flow of resin into pocket 440, during assembly. The resin will help secure the liner 405, FIG. 17, in position, during an assembly process.

Figure 20:
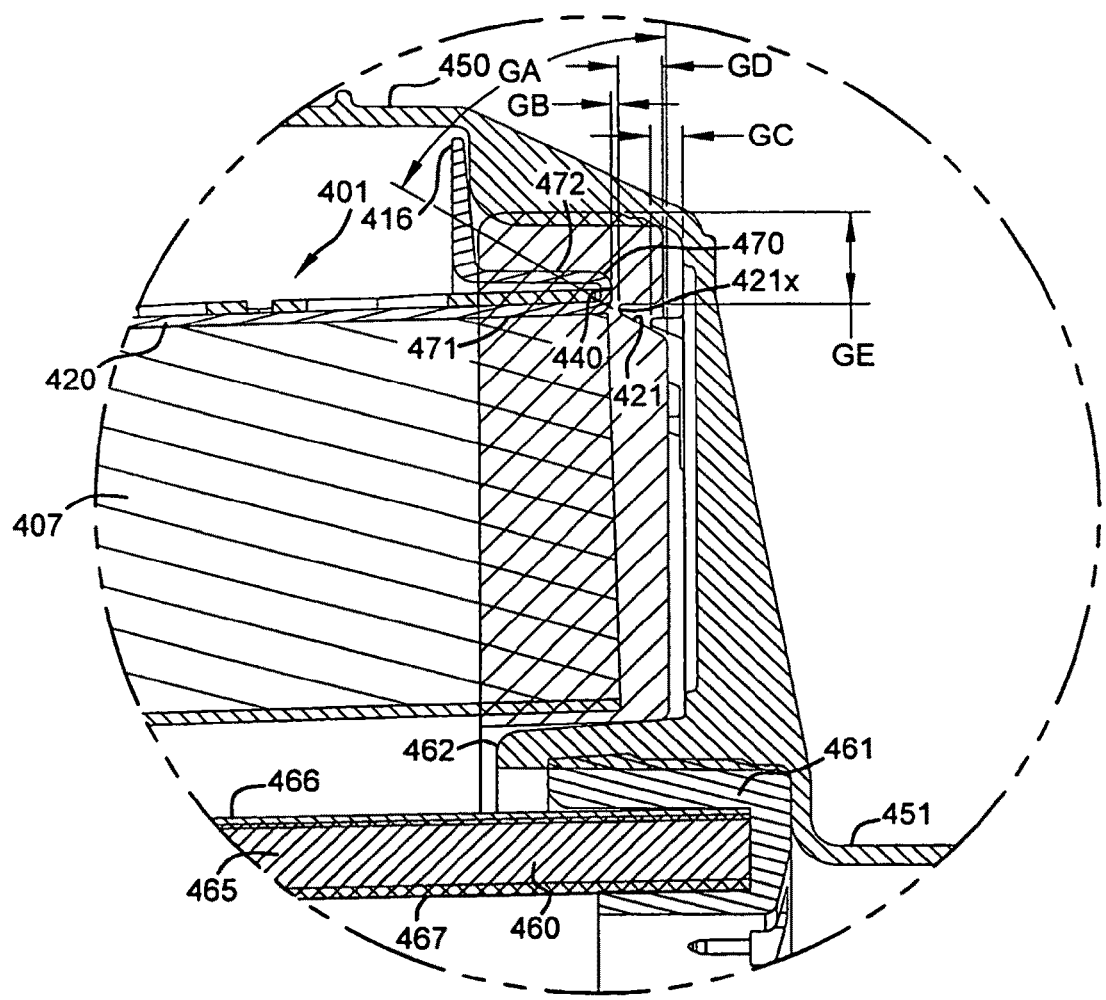
FIG. 20 is an enlarged schematic fragmentary cross-sectional view depicting the filter cartridge of FIGS. 17-19, positioned in an air cleaner for use.

Referring to FIG. 20, installation of cartridge 401 in housing 450 is shown. FIG. 20 is generally analogous to FIG. 9. It is noted that groove 421, FIG. 20, is positioned in axial overlap with support 420, and thus the deepest region 421x, is slightly, radially, outside of the media 407.

It is noted in FIG. 20, that a safety element 460 is positioned with an inwardly directed radial seal at 461 sealed to projection 462. The particular safety element 460 depicted includes media 465 between inner and outer liners 466, 467.

A housing outlet is shown at 451.

Example dimensions provided in FIG. 20 are as follows: GA=60°; GB=0.9 mm; GC=5.6 mm; GD=5.5 mm; GE=11.8 mm.

A process analogous to that described for FIGS. 4-6 can be used to form end cap 402.

If the closed end cap with liner 405 and media 427 embedded therein is first made, the manufacturing process is simplified. This is because the support 420, through receipt of the liner 405 in pocket 440, will support the media above a bottom of the mold.

VIII. An Alternate Airflow Inlet, FIG. 23 of U.S. Ser. No. 11/415,528

Figure 23:
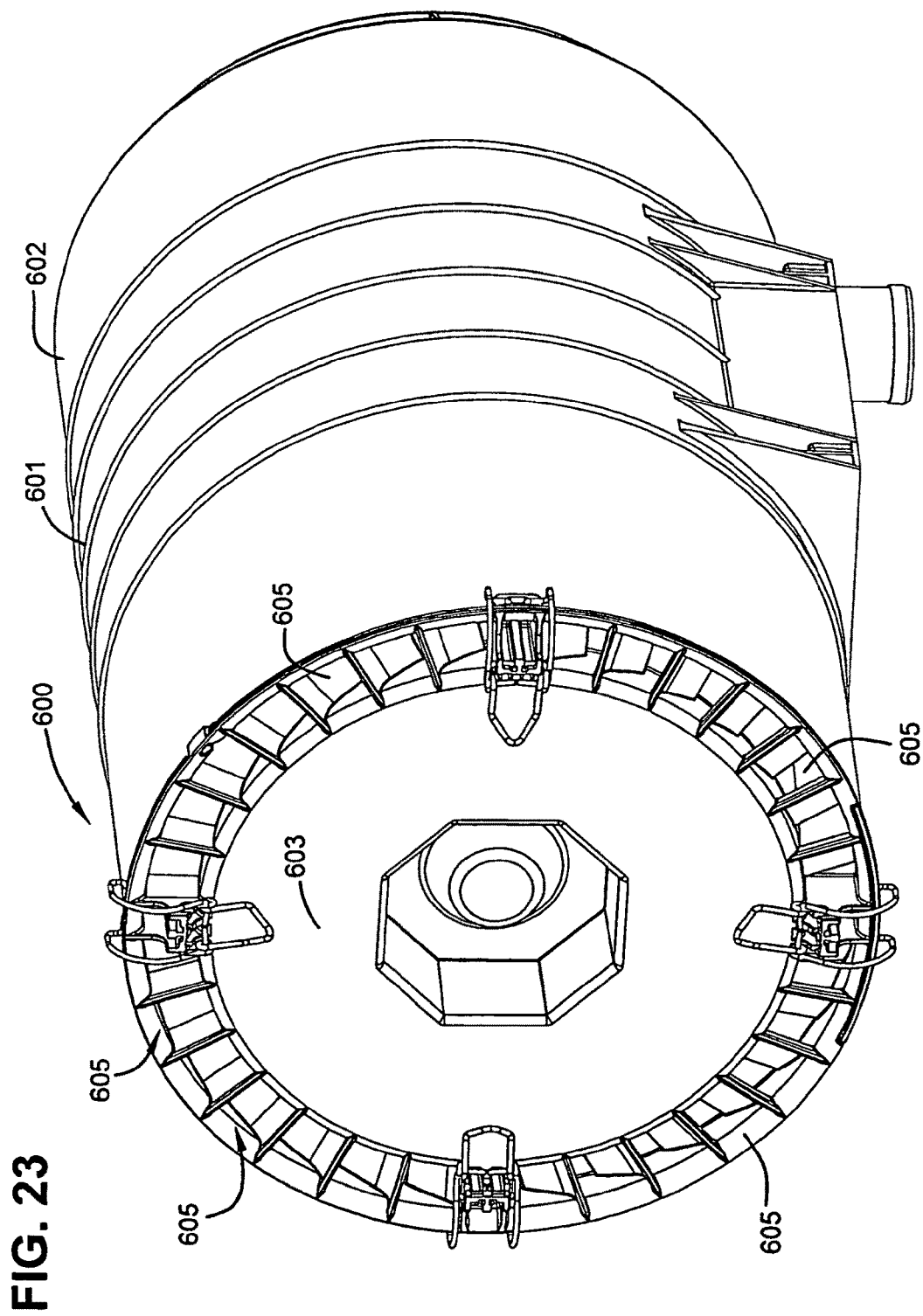
FIG. 23 is an end perspective view of an air cleaner generally analogous to the air cleaner of FIG. 7, but with an alternate inlet structure in an access cover.

Referring to FIG. 23, an air cleaner 600 is depicted comprising a housing 601 having a body 602 and access cover 603 mounted thereon. For the example of FIG. 23, the access cover 603 includes an inlet vane arrangement 605 therein, forming an inlet arrangement for airflow into an interior of the housing 601. The vane arrangement 605 is configured to drive inlet air in a circular pattern, in the example shown a clockwise pattern, upon entry into the housing body 602, although an opposite direction of air rotation can be used. This is a difference from the previous examples, in which the inlets, for example inlet 78, FIG. 7 were side entry inlets in a sidewall of the body section, and not through the access cover. The variation of FIG. 23 provides for an end inlet 605 and can be applied with the cartridge embodiments previously described.

IX. Improvements to the Arrangements of U.S. Ser. No. 11/415,528; see FIGS. 24-29

In FIGS. 24-29, improvements relating to certain features and techniques are described, that are applicable to the arrangements of FIGS. 1-23. In FIGS. 24-29, a particular example is depicted, to provide an understanding of the advantageous features, which uses a cartridge with many of the features of FIGS. 17-22 installed in a housing generally in accord with many of the features of FIG. 16. However, again, the techniques described can be applied in a variety of alternate arrangements, including in accord with features of various ones of FIGS. 1-23.

Referring first to FIG. 25, an air cleaner 700 is depicted including serviceable filter cartridge 701. The cartridge 701 comprises media 702 arranged around an open central volume 703. In the example, the media 702 is pleated media 704, but alternatives are possible. The media 702 defines conical (or frusto-conical) shape and extends between end caps 709 and 710, with the narrower end being at end cap 709. End cap 709 comprises composite end cap with a molded-in-place ring 709a securing in place a central preform projection 709b. The central preform projection 709b extends into an open interior 703 of the cartridge 701.

End cap 710 is an open end cap, having open central aperture 710a and outer outwardly directed radial seal region 710b.

Cartridge 701 is installed in an air cleaner housing 720, the housing 720 has an outer side wall 721 surrounding an open cartridge receiving interior 722.

The housing 720 has an open end 724 closed by removable access cover 725. The access cover 725 is secured in place by clamps 726. The access cover 725 includes a projection 729, in this instance having a non-circular exterior, that projects into receiver 709b. The projection 729 includes a central outwardly projecting frusto-conical member 709c, which receives an analogous outwardly projecting frusto-conical member 709c, in center piece 709b.

Still referring to FIG. 25, the air cleaner 700 includes a safety or secondary filter cartridge 740 comprising media 740a extending between first and second end caps 741, 742. End cap 741 is an open end cap, which seals in place outwardly directed radial seal. End cap 742 is closed, and includes an outwardly projecting somewhat frusto-conical projection 744 thereon, which extends into a receiver formed by projection 709c. The media 740a surrounds a central interior 740e and has a conical shaped side definition.

The housing further includes a dust ejector port 750 thereon, with vac valve arrangement 751 mounted on tube 750x. The access cover 725 further includes shield 760 and ramp 761 therein, in accord with previous descriptions.

In FIG. 24, a perspective view of housing 720 is viewable, with access cover 725 removed. The housing 720 can be seen to have dust ejection tube 750x, clean air flow outlet 770 and air flow inlet 771. The particular air flow inlet depicted, is a tangential inlet, but alternate arrangements can be used, and the inlet can be positioned in alternate locations on housing 720, as previously described, including, for example, in access cover 775. Base 775 is also positioned on the housing 720, for mounting of the housing in place.

It is noted that in FIG. 24 the housing section 720 is depicted without evacuator valve member 751 in place. The portion of the housing section 720 depicted in FIG. 24, can comprise an integral molded component, formed of plastic.

Attention is now directed to FIG. 26, an enlarged fragmentary view of a portion of FIG. 25. In FIG. 26 a portion of housing side wall 721 is depicted, as well as a portion of end wall 780 of housing 720, which surrounds outlet 770, FIG. 26. A portion of cartridge 701 is viewable, in particular a portion of end cap 710, including outer radial seal portion 710b.

Further groove 800 in end cap 710 receiving therein projection, rib or ring 781 on housing end wall 780 is viewable. These features are in accord with descriptions for previously discussed figures.

Still referring to FIG. 26, outer liner 801 is viewable, as well as insert 802. Insert 802 may be generally in accord with insert (shield) 420, FIG. 20. As a result, insert 802 extends around an end 801a and liner 801, and forms outwardly, radially directed, dust flange 810.

Thus far, the features described in connection with FIGS. 24, 25 and 26 are generally analogous to those previously described, for certain previously described embodiments.

Referring to FIG. 26, housing end wall 780 includes a projecting rib or ring arrangement 820, which presses against, and into, a portion 710b of end cap 710 at a location between groove 800 and outer annular radial seal surface 825. The projection 820 can be a continuous ring or rib around outlet 720, or a discontinuous ring or rib. The ring or rib 820 is positioned to press against and project into end surface portion 826 of end cap 710, in particular a surface portion at an end of seal region 710b, when cartridge 701 is installed. The portion 826 of end cap 710 contacted by ring or rib 820 is typically flat and non-grooved.

Referring to FIG. 27, a schematic end view of housing 720 is viewable. Ring or rib 820 can be seen to circumscribe outlet 770. Ring or rib 820, for the example shown, is a segmented ring comprising individual sections 820a. Ring or rib 820a is seen to surround, and be spaced outwardly from projection 781, which is itself a segmented ring.

Example dimensions are provided in FIG. 27 as follows: AA=330.6 mm; AB=260 mm; AC=15°; AD=30°; AF=15°; AE=5°; AG=22.5°; AH=45°; AI=15 mm radius; AJ=218 mm; AK=211.8 mm; and, AL=165 mm.

In FIG. 28, a cross-sectional view of housing 720, with access cover 725, FIG. 25 removed; and, without either main cartridge 701 or safety cartridge 740 installed. Further, vac valve 751, FIG. 26, is not shown on the housing of FIG. 28.

In FIG. 28, example dimensions are included as follows: BA=53 mm; BN=49 mm; BM=50.8 mm; BB=40 mm; BC=287.8 mm; BD=313.82 mm; BE=75.5 mm; BF=27 mm; BG=523.4 mm; BH=2.5 mm; BI=30.6 mm; BJ=186.5 mm; BK=25 mm; and, BL=319.83 mm.

In FIG. 29, an enlarged fragmentary view of a portion of FIG. 28 can be viewed. Bead 820 is viewable. Example dimensions in FIG. 29 are as follows: CA=3 mm; CB=3 mm; radius CD=1.5 mm.

Generally speaking, the ring or rib 820 will project inwardly from immediately adjacent regions of the end 780, by a distance of at least 1 mm, and typically 1.5-4.0 mm, an example being 3 mm, and a usual range being 2.5-4.0 mm.

Referring to FIG. 25, bead 780 helps stabilize the cartridge 701, especially in seal region 710b. The cartridge 701 will be pressed between ring 820 and access cover 725, through engagement of projections 709x on end cap 709 with cover 725. This will help inhibit movement of the cartridge 701 in the general direction of a central axis Z, FIG. 18, when cartridge 701 is installed. The location of the ring 820 in overlap with a portion of seal region 710b, between liner 801, and surface 825, and spaced radially outwardly from groove 800, FIG. 26, is preferred.

In general terms, according to the present disclosure, an air cleaner is provided which includes a housing defining an interior and including an end outlet. The housing includes an end wall surrounding the end outlet. The housing further includes an annular housing seal surface surrounding the end wall and a first ring or rib (820) projecting into the interior of the housing from the end wall. The first ring or rib (820) is spaced from both the end outlet and the housing annular radial seal surface.

An air filter cartridge is removably positioned within the housing interior. The cartridge comprises a region of filter media surrounding and defining an open central interior and first and second end caps. The media extends between the first and second end caps, the first end cap being closed to flow of air therethrough and the second end cap being an open end cap having an outer, annular, outwardly directed housing radial seal portion and an end surface.

The air filter cartridge is positioned within the housing with the first ring or rib (820) pressed against and pushing into an end of the first end cap and with the housing radial seal portion of the end cap radially sealed to the annular housing seal surface of the housing.

When it is said that the first ring is "pressed or projects against" and/or "pushes or presses into" the end of the first end cap, it is meant that the ring 820 engages or contacts an end surface of the end cap, as opposed to being directed into a groove in the end cap.

In the example shown, the first ring (820) is a segmented ring, although a continuous ring can be used.

In an example depicted, the second end cap includes a groove (typically with an innermost portion spaced radially no more than 3 mm from an outer edge of the media and typically no more than 15 mm from the outwardly directed housing radial seal surface); and, the housing includes a second rib or ring (781) projecting into the interior of the housing from the end wall. The second ring is spaced from both the end outlet and the housing annular seal surface, and the filter cartridge is positioned with the second ring projecting into the groove of the second end cap. The second ring end can comprise a segmented ring, as shown, or can comprise a continuous ring.

In an example depicted, the filter cartridge includes an outer liner and the first ring projects against the end of the second end cap at a location between the outer liner and the outwardly directed radial seal portion.

What is claimed is:
1. An air cleaner comprising:
(a) a housing defining an interior and including an end outlet;
  (i) the housing including an end wall surrounding the end outlet;
  (ii) the housing including an annular housing seal surface surrounding the end wall; and
  (iii) the housing including a first ring projecting into the interior of the housing from the end wall;
    (A) the first ring being spaced from both the end outlet and the housing annular radial seal surface; and
(b) an air filter cartridge removably positioned within the housing interior; the filter cartridge comprising:
  (i) a region of filter media surrounding and defining an open central interior; and,
  (ii) first and second end caps;
    (A) the media extending between the first and second end caps;
    (B) the first end cap being closed to flow of air therethrough; and,
    (C) the second end cap being an open end cap having an outer, annular, outwardly directed housing radial seal portion, an end surface and a groove; the end surface not being positioned in a groove in the end cap; and,
  (iii) the air filter cartridge being positioned with:
    (A) the first ring projecting against the end surface of the second end cap and not in the groove; and,
    (B) the housing radial seal portion of the second end cap radially sealed to the annular housing seal surface of the housing.
2. An air cleaner according to claim 1 wherein:
(a) the first ring projecting into the interior of the housing from the end wall is a segmented ring.
3. An air cleaner according to claim 1 wherein:
(a) the housing includes a second ring projecting into the interior of the housing from the end wall;
  (i) the second ring being spaced from both the end outlet and the housing annular radial seal surface; and,
(c) the air filter cartridge being positioned with:
  (i) the second ring projecting into the groove on the second end cap.
4. An air cleaner according to claim 3 wherein:
(a) the first ring surrounds the second ring.
5. An air cleaner according to claim 3 wherein:
(a) the second ring is a segmented ring.
6. An air cleaner according to claim 1 wherein:
(a) the filter cartridge includes an outer liner; and,
(b) the first ring projects against the end of the second end cap at a location between the outer liner and the outwardly directed radial seal portion.
7. An air cleaner according to claim 1 wherein:
(a) the first ring projects inwardly from the housing end wall a distance of at least 1 mm.
8. An air cleaner according to claim 7 wherein:
(a) the first ring projects inwardly from the housing end wall a distance within the range of 1.5 to 4.0 mm, inclusive.
9. An air cleaner according to claim 1 wherein:
(a) the first ring projects into the end surface of the second end cap a distance of at least 0.1 mm.
10. An air cleaner according to claim 3 wherein:
(a) the second ring that projects into the interior of the housing from the end wall projects at least 2 mm into the interior of the housing from the end wall; and
(b) the groove is at least 1.5 mm deep in minimum depth from an adjacent outer axial surface of the second end cap.
11. An air cleaner according to claim 10 wherein:
(a) the innermost portion of the groove is positioned in axial overlap with the media.
12. An air cleaner according to claim 10 wherein:
(a) an innermost portion of the groove is positioned radially outwardly from the media.
13. An air cleaner comprising:
(a) a housing defining an interior and including an end outlet;
  (i) the housing including an end wall surrounding the end outlet;
  (ii) the housing including an annular housing seal surface surrounding the end wall; and
  (iii) the housing including a first ring projecting into the interior of the housing from the end wall;
    (A) the first ring being spaced from both the end outlet and the housing annular radial seal surface; and
(b) an air filter cartridge removably positioned within the housing interior; the filter cartridge comprising:
  (i) a region of filter media surrounding and defining an open central interior; and,
  (ii) first and second end caps;
    (A) the media extending between the first and second end caps;

(B) the first end cap being closed to flow of air therethrough; and,
(C) the second end cap being an open end cap having an outer, annular, outwardly directed housing radial seal portion and an end surface; and,
(iii) the air filter cartridge being positioned with:
(A) the first ring projecting against the end of the second end cap; and,
(B) the housing radial seal portion of the second end cap radially sealed to the annular housing seal surface of the housing;
(c) the second end cap including a groove; and
(d) the housing including a second ring projecting into the interior of the housing from the end wall;
(i) the second ring being spaced from both the end outlet and the housing annular radial seal surface;
(e) the air filter cartridge being positioned with:
(i) the second ring projecting into the groove on the second end cap.

14. An air cleaner according to claim 13 wherein:
(a) the first ring surrounds the second ring.

15. An air cleaner according to claim 14 wherein:
(a) the second ring is a segmented ring.

16. An air cleaner according to claim 13 wherein:
(a) the filter cartridge includes an outer liner; and,
(b) the first ring projects against the end of the second end cap at a location between the outer liner and the outwardly directed radial seal portion.

17. An air cleaner comprising:
(a) a housing defining an interior and including an end outlet;
(i) the housing including an end wall surrounding the end outlet;
(ii) the housing including an annular housing seal surface surrounding the end wall; and
(iii) the housing including a first ring projecting into the interior of the housing from the end wall;
(A) the first ring being spaced from both the end outlet and the housing annular radial seal surface;
(b) an air filter cartridge removably positioned within the housing interior; the filter cartridge comprising:
(i) a region of filter media surrounding and defining an open central interior; and,
(ii) first and second end caps;
(A) the media extending between the first and second end caps;
(B) the first end cap being closed to flow of air therethrough; and,
(C) the second end cap being an open end cap having an outer, annular, outwardly directed housing radial seal portion and an end surface; and,
(iii) the air filter cartridge being positioned with:
(A) the first ring projecting against the end of the second end cap; and,
(B) the housing radial seal portion of the second end cap radially sealed to the annular housing seal surface of the housing;
(c) the filter cartridge including an outer liner; and,
(d) the first ring projecting against the end of the second end cap at a location between the outer liner and the outwardly directed radial seal portion.

* * * * *